US010960754B2

(12) United States Patent
Lindberg et al.

(10) Patent No.: US 10,960,754 B2
(45) Date of Patent: Mar. 30, 2021

(54) MOLD ASSEMBLY FOR ACTIVE GRILLE SHUTTER SYSTEM

(71) Applicant: Magna Exteriors Inc., Concord (CA)

(72) Inventors: Braendon R. Lindberg, Metamora, MI (US); Ross J. Parpart, Troy, MI (US); Anthony J. Povinelli, Romeo, MI (US); Daniel Vander Sluis, Rochester Hills, MI (US)

(73) Assignee: MAGNA EXTERIORS, INC., Concord (CA)

( * ) Notice: Subject to any disclaimer, the term of this patent is extended or adjusted under 35 U.S.C. 154(b) by 0 days.

(21) Appl. No.: 16/827,261

(22) Filed: May 7, 2020

(65) Prior Publication Data

US 2020/0346538 A1 Nov. 5, 2020

Related U.S. Application Data

(63) Continuation of application No. PCT/US2020/024107, filed on Mar. 22, 2020, which (Continued)

(51) Int. Cl.
| | |
|---|---|
| *B60K 11/08* | (2006.01) |
| *F24F 13/15* | (2006.01) |
| *B29C 48/09* | (2019.01) |
| *B29C 48/00* | (2019.01) |
| *B29C 45/00* | (2006.01) |
| *F01P 7/10* | (2006.01) |
| *B29K 23/00* | (2006.01) |
| *B29K 55/02* | (2006.01) |
| *B29K 77/00* | (2006.01) |

(Continued)

(52) U.S. Cl.
CPC .......... *B60K 11/085* (2013.01); *B29C 45/006* (2013.01); *B29C 48/0021* (2019.02); *B29C 48/09* (2019.02); *F24F 13/15* (2013.01); *B29K 2023/12* (2013.01); *B29K 2055/02* (2013.01); *B29K 2077/00* (2013.01); *B29K 2509/08* (2013.01); *B29L 2031/3005* (2013.01); *F01P 7/10* (2013.01); *Y02T 10/88* (2013.01)

(58) Field of Classification Search
CPC ...... B60K 11/00; B60K 11/085; B62D 35/00; B29C 45/006; B29C 48/0021; B29C 48/09; F24F 13/15
See application file for complete search history.

(56) References Cited

U.S. PATENT DOCUMENTS 4,410,032 A * 10/1983 Mori ................... B60K 11/085
123/41.06
7,325,864 B1 * 2/2008 Echeverria .............. B60R 19/52
180/68.6
(Continued)

*Primary Examiner* — John D Walters
*Assistant Examiner* — James J Triggs
(74) *Attorney, Agent, or Firm* — Warn Partners, P.C.

(57) ABSTRACT

An active grille shutter system (AGS) that is assembled from modular components, thereby allowing the AGS to be any desired width or height when assembled. This allows for the creation of different sized AGS for different vehicle platforms, while assembling the AGS from a stock of components that is common to each AGS. The invention is also directed to a method of forming a base integrated end cap with moveable vane retainers and a link arm using a two shot molding process.

27 Claims, 19 Drawing Sheets

Related U.S. Application Data is a continuation of application No. 16/704,969, filed on Dec. 5, 2019, now Pat. No. 10,766,356, which is a continuation of application No. 16/322,324, filed as application No. PCT/IB2017/054926 on Aug. 11, 2017, now Pat. No. 10,525,819, which is a continuation of application No. 16/495,594, filed as application No. PCT/US2018/023589 on Mar. 21, 2018, which is a continuation of application No. PCT/IB2018/057868, filed on Oct. 10, 2018.

(60) Provisional application No. 62/822,138, filed on Mar. 22, 2019, provisional application No. 62/915,788, filed on Oct. 16, 2019, provisional application No. 62/374,375, filed on Aug. 12, 2016, provisional application No. 62/474,369, filed on Mar. 21, 2017, provisional application No. 62/570,391, filed on Oct. 10, 2017.

(51) Int. Cl.
*B29K 509/08* (2006.01)
*B29L 31/30* (2006.01)

(56) References Cited

U.S. PATENT DOCUMENTS

| | | | |
|---|---|---|---|
| 8,714,290 B2* | 5/2014 | Kitashiba | B60K 11/085 180/68.1 |
| 9,604,534 B1* | 3/2017 | Zhou | B60K 11/085 |
| 9,925,861 B2* | 3/2018 | Bruckner | B60K 11/085 |
| 9,950,750 B2* | 4/2018 | Babbage | B60D 1/015 |
| 10,093,173 B1* | 10/2018 | Frayer | B60K 11/085 |
| 2012/0074729 A1* | 3/2012 | Fenchak | B60K 11/085 296/193.1 |
| 2014/0273807 A1* | 9/2014 | Frayer, III | B60K 11/085 454/335 |

* cited by examiner

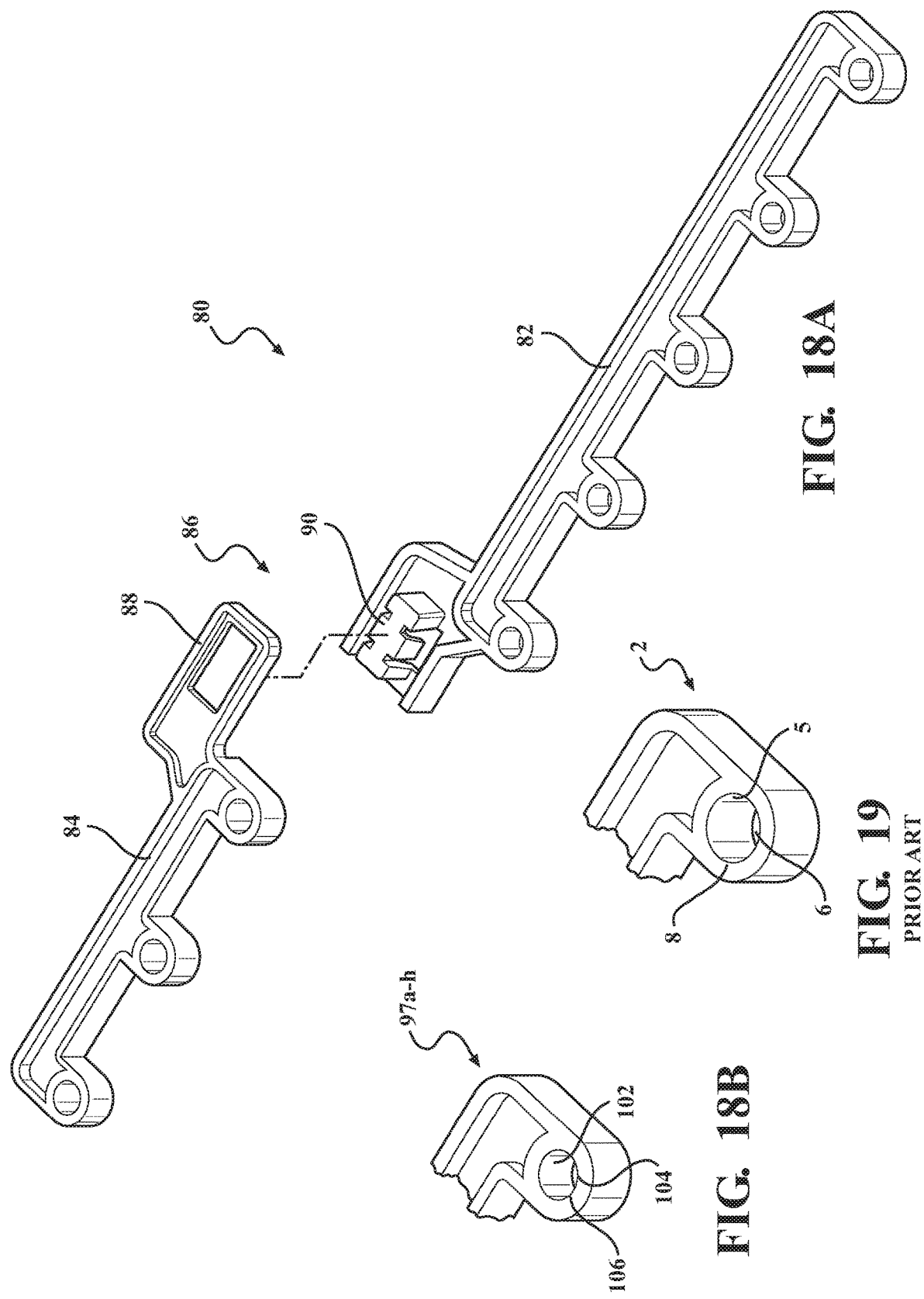

MOLD ASSEMBLY FOR ACTIVE GRILLE SHUTTER SYSTEM

FIELD OF THE INVENTION

The present invention relates to an in mold assembly for complete in mold forming of an integrated end cap for use on an active grille shutter system. The present invention also relates to a vertically scalable frame for an active grille shutter system assembled from modular components.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Active grille systems that have been developed usually have a frame is molded as a complete part. During assembly, the frame and/or the vanes must be distorted in order to assemble the complete system onto the one piece frame. Additionally, the one piece frame has a low shipping density as it is mostly empty space. Furthermore, if an active grille system has two variants with either additional vanes or a base air flow, a complete new frame must be molded and shipped. It is therefore desirable to provide a frame that is multiple separate molded parts instead of one complete molding. This will aid in the assembly of the active grille shutter system without having to distort the frames or the vanes. Additionally, having multiple components accommodates the various variants that can be needed depending on the application. Lastly, having a multi-piece frame increases the shipping density since the various components can be stacked more closely together. It is desirable to provide and AGS system that is modular an allows different size and shaped AGS systems to be created from stock components having various sizes.

SUMMARY OF THE INVENTION

The present invention is directed to an active grille shutter system (AGS) assembled from modular components. The AGS according to the invention can be expanded both horizontally and vertically using building blocks of components that allow the AGS to be designed to have virtually any width or height. The height of the AGS is provided in part by a base integrated end cap having a first end and a second end. The base integrated end cap includes one or more driven retainers each having a vane connection side and an end cap connection side rotatably fixed to the base integrated end cap. Further provided is a drive retainer with a vane connection side and an end cap connection side rotatably fixed to the base integrated end cap.

The AGS further includes a driven retainer end cap extension having the one or more driven retainers having a vane connection side and an end cap connection side rotatably fixed to the driven retainer end cap extension. A first end of the driven retainer end cap extension connects to the second end of the base integrated end cap. This allows for one side of the AGS to be extended vertically or in height. There is further provided a link arm connected to and extending between each of the one or more driven retainers and the drive retainer of both the base integrated end cap and the driven retainer end cap extension.

On an opposing side of the AGS there is a base non-integrated end cap having a first end and a second end. The base non-integrated end cap includes a plurality of posts equal to both the number of one or more driven retainers and the drive retainer located on the base integrated end cap. There is further provided a post end cap extension having a first end and a second end, and one or more posts equal to the number of one or more driven retainers of the driven retainer end cap extension. The first end of a post end cap extension connects to the second end of the base non-integrated end cap extension. This allows for a second side opposite the base integrated end cap and driven retainer extension to also be extended vertically or in height.

Forming the top and bottom sides, or horizontal sides of the AGS is a first universal rail and a second universal rail each having a first end and a second end. The first universal rail is connected to the first end of the base integrated end cap at the first end of the first universal rail. The second end of the first universal rail is connected to the first end of the base non-integrated end cap, thereby forming a bottom side of the active grille shutter system. The second universal rail is connected to the second end of the driven retainer end cap extension and the second end of the post end cap extension, thereby forming a top side of the active grille shutter system. The first universal rail and the second universal rail are preferably formed by extrusion and are capable of being any desired length, which provides an AGS of any desired width or length. Additionally, the first universal rail and the second universal rail can be cut down to a desired shorter length to form an AGS having a shorter width or length.

An aperture of the active grille shutter system is formed and defined by the top side, bottom side, base integrated end cap and the driven retainer end cap extension on a first side and the based non-integrated end cap and the post end cap extension on a second side. A plurality of base vanes, where each respective one of the plurality of base vanes rotatably extends across the aperture and connects at a first end to one of the plurality of posts of the base non-integrated end cap and at a second end to one of the one or more driven retainers or the drive retainer. The AGS further includes a plurality of extension vanes. Each one of the plurality of extension vanes rotatably extends across the aperture and connects at a first end to one of the plurality of posts of the base non-integrated end cap and at a second end to one of the one or more driven retainers of the driven retainer end cap extension.

BRIEF DESCRIPTION OF THE DRAWINGS

The present invention will become more fully understood from the detailed description and the accompanying drawings, wherein:

FIG. 18A is a side perspective view of a disconnected two piece link arm according to another aspect of the invention.

FIG. 18B is a side perspective view of an enlarged portion of the link arm.

FIG. 19 is a prior art view of an enlarged portion of a link arm.

DETAILED DESCRIPTION OF THE PREFERRED EMBODIMENTS

Figure 1:
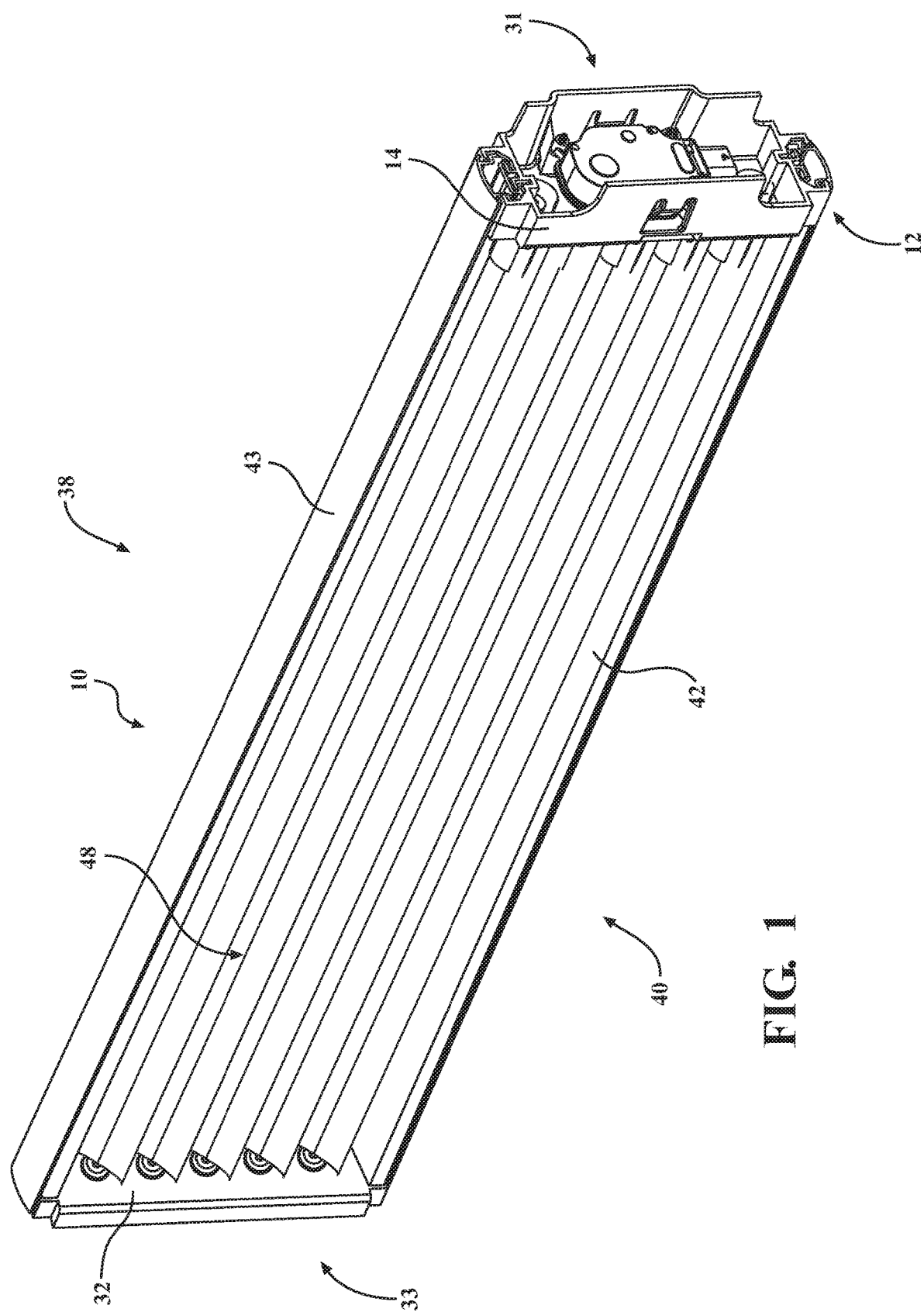
FIG. 1 is a rear side perspective view of an integrated end cap connected to the vanes of an active grille shutter system according to the first and second embodiments of the invention.

The following description of the preferred embodiments is merely exemplary in nature and is in no way intended to limit the invention, its application, or uses.

One aspect embodiment of the present invention involves the method of forming the integrated end cap, which is accomplished using a two shot molding process. The molding process allows for the formation of the integrated end cap with moveable retainers rotatably connected to both the end cap and link arm in a single mold, without the need to additional assembly.

Referring to FIGS. 11A, 11B, 11C and 11D a method 200 of in mold forming an integrated end cap 202 for use on an active grille shutter system is schematically shown. The method 200 shown is carried out in two mold cavities that includes a first mold cavity 204 and second mold cavity 206 using a rotary molding tool, or it can be accomplished using a single mold tool with moving inserts. The method 200 includes the step of providing the first mold cavity 204 with an integrated end cap body forming surface 208 and a link arm forming surface 210 by using a first platen 212, a second platen 214 and a third platen 216 to form the integrated end cap body forming surface 208, and the third platen 216 and a link arm platen 218 that close form the link arm forming surface 210. A step of providing at least one first shot injection port 220 connected to the link arm forming surface 210 and the integrated end cap retainer forming surface 208. The formation of the integrated end cap 220 begins by injecting a first shot of molten material through the at least one first shot injection port 220 into the link arm forming surface 210 and the integrated end cap body forming surface 208 and forming a link arm 30 and an integrated end cap body 14, 114.

The next step includes changing the first mold cavity 204 into the second mold cavity 206. This is accomplished by removing portions of the first mold cavity 204 and providing at least one vane retainer forming surface 222 formed from a first platen 212', the integrated end cap body 14, 114, the and link arm 30, a vane retainer platen 224 and a spacer 226 positioned between the link arm 30 and the integrated end cap body 14, 114. There is a retainer spacer 223 positioned between the retainer forming surface 222 and the integrated end cap body 14, 114. The integrated end cap body 14, 114 and the link arm 30 are part of the at least one vane retainer forming surface 222.

The method 200 then includes the step of providing at least one second shot injection port 228 connected to the at least one vane retainer forming surface 222. Next a step of injecting a second shot of molten material through the at least one second shot injection port 228 into the at least one vane retainer forming surface 222 and forming at least one vane retainer 230 using the link arm 30 and the integrated end cap body 14, 114 as portions of the at least one vane retainer forming surface 222. The at least one vane retainer 130 can be either one of a driven retainer 18a-d, 118a-d or a drive retainer 24 as discussed below. Additionally, the integrated end cap 202 can be part of a base integrated end cap or base integrated end cap extension, which is described in greater detail below. The final step includes opening the mold tool and removing a base integrated end cap 12, 112 which will be described in greater detail below.

The base integrated end cap 12, 112 is formed in the molding tool without the need for manual assembly of the components. This provides a significant savings in the cost of producing the base integrated end cap 12, 112 when compared to the prior art assemblies. However, in order to form the base integrated end cap 12, 112 the vane retainer 130 must be rotatably connected to the link arm 30 and the end cap through the apertures. This is accomplished during the molding process by using two different shots of molten material having different shrinkage rates. In one embodiment of the invention the first shot of molten material is preferably a polypropylene material having a mold shrinkage value of about 0.5% and the second shot of molten material is a polybutylene terephthalate material having a mold shrinkage value of greater than about 0.5%. In another aspect of the invention the first shot is a polyamide material having a mold shrinkage value of about 0.5% and the second shot of molten material is a polybutylene terephthalate material having a mold shrinkage value of greater than about 0.5%. The term mold shrinkage value is a rate percentage of the volume contraction of the polymers during the cooling step of the processing of the polymers. In one exemplary embodiment of the invention the polyamide material has about 33% glass fiber filler by weight of the polyamide material with the glass fiber filler and the polybutylene terephthalate material has about 20% glass fiber filler by weight of the polybutylene terephthalate with a glass filler. In another embodiment of the invention the first shot of molten material is formed of polyamide material having a mold shrinkage value of about 0.003 at ⅛" bar, in/in and the second shot of molten material is polybutylene terephthalate material having a mold shrinkage value of greater than about 0.004 at ⅛" bar, in/in. In this embodiment the polyamide material has about 33% glass fiber filler by weight of the polyamide material with the glass fiber filler and the polybutylene terephthalate material has about 20% glass fiber filler by weight of the polybutylene terephthalate material with a glass filler. An example of a suitable polyamide material is Ultramid® 8233G HS BK-102 Polyamide 6 produced by BASF Corporation 1609 Biddle Avenue, Wyandotte, Mich. 48192. An example of a suitable polybutylene terephthalate material is Ultradur® B 4300 G4 PBT (Polybutylene Terephthalate) produced by BASF Corporation 1609 Biddle Avenue, Wyandotte, Mich. 48192. However, it is within the scope of this invention to us other suitable polyamide and polybutylene terephthalate materials.

In another embodiment of the invention the first shot of molten material is Polypropylene-GF, which is a glass filled polypropylene; the second shot of molten material is Polyamide-GF, which is a glass filled polyamide. An example of a suitable polypropylene material is PPH2GF3 produced by Washington Penn Plastic Corporation 450 Racetrack Road, PO Box 236, Washington, Pa. 15301. An example of a suitable polyamide material is Ultramid® 8233G HS BK-102 Polyamide 6 produced by BASF Corporation 1609 Biddle Avenue, Wyandotte, Mich. 48192. In this embodiment the first shot of molten material and the second shot of molten material have about the same shrinkage rate. The method in this embodiment of the invention includes after the step of injecting the first shot of molten material a step of cooling and shrinking the first shot of molten material occurs before the step of injecting the second shot of molten material. This way the first shot of molten material is fully shrunk before the second shot of material is introduced.

In another aspect of the invention using polypropylene material, the polypropylene material has about 33% glass fiber filler by weight of the polypropylene material with the glass fiber filler and the polybutylene terephthalate material has about 20% glass fiber filler by weight of the polybutylene terephthalate with a glass filler. In another embodiment of the invention the first shot of molten material is formed of polypropylene material having a mold shrinkage value of about 0.003 at ⅛" bar, in/in and the second shot of molten material is polybutylene terephthalate material having a mold shrinkage value of greater than about 0.004 at ⅛" bar, in/in. In this embodiment the polypropylene material has about 33% glass fiber filler by weight of the polypropylene material with the glass fiber filler and the polybutylene terephthalate material has about 20% glass fiber filler by weight of the polybutylene terephthalate material with a glass filler. An example of a suitable polybutylene terephthalate material is Ultradur® B 4300 G4 PBT (Polybutylene Terephthalate) produced by BASF Corporation 1609 Biddle Avenue, Wyandotte, Mich. 48192. However, it is within the scope of this invention to use other suitable polypropylene and polybutylene terephthalate materials.

Another aspect of the invention involves providing an active grille shutter system assembled from modular components. The active grille shutter system has both horizontal scalability buy using extruded universal rail members and vanes. Additionally, the active grille shutter system has vertical scalability by having integrated connection features that allow the various components to be connected in a proper orientation without requiring mechanical or chemical fastening elements.

Figure 8A:
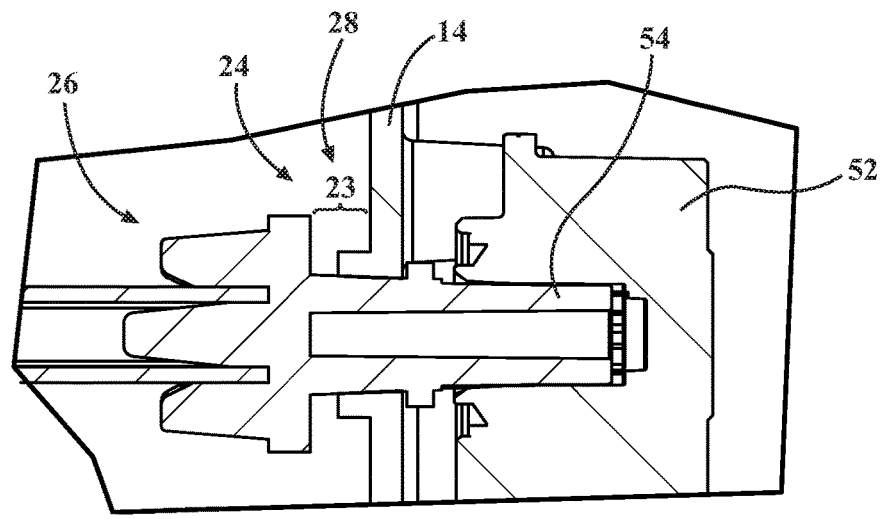
FIG. 8A is an enlarged cross-sectional side view of a drive retainer.
Figure 8B:
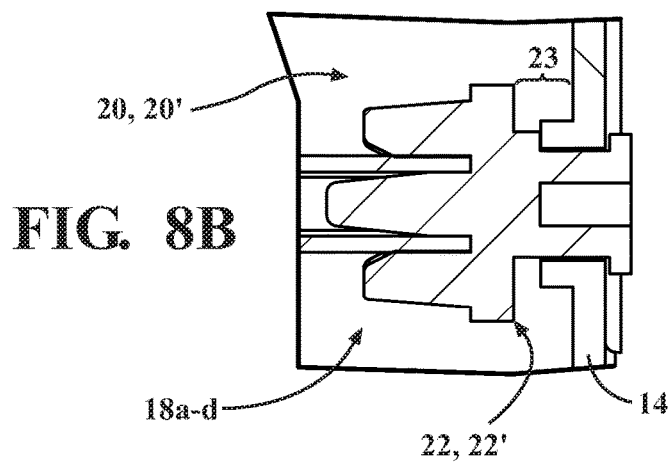
FIG. 8B is an enlarged cross-sectional side view of a driven retainer.

Referring now to FIGS. 1-4 an active grille shutter system (AGS) 10 according to one aspect of the present invention is shown. The AGS 10 includes the base integrated end cap 12 an integrated end cap body 14 with a first female key 16a at a first end and a second female key 16b at a second end. The base integrated end cap 12 further includes one or more driven retainers 18a-d, shown in FIG. 8B, each having a vane connection side 20 and an end cap connection side 22 rotatably fixed to the integrated end cap body 14. Referring also to FIG. 8A there is a drive retainer 24 with a vane connection side 26 and an end cap connection side 28 rotatably fixed to the integrated end cap body 14. A drive post 54 extends from the end cap connection side 22, through the integrated end cap body 14 and into an actuator 52. The actuator 52 then rotates the drive post 54 and the driven retainer 24. The actuator 52 described herein is a rotary motor with gears, however, it is within the scope of this invention for the actuator to be a different device such as a servo, linear actuator, solenoid actuator or virtually any type of mechanical or electrical device suitable for driving the active grille shutter system.

Figure 2:
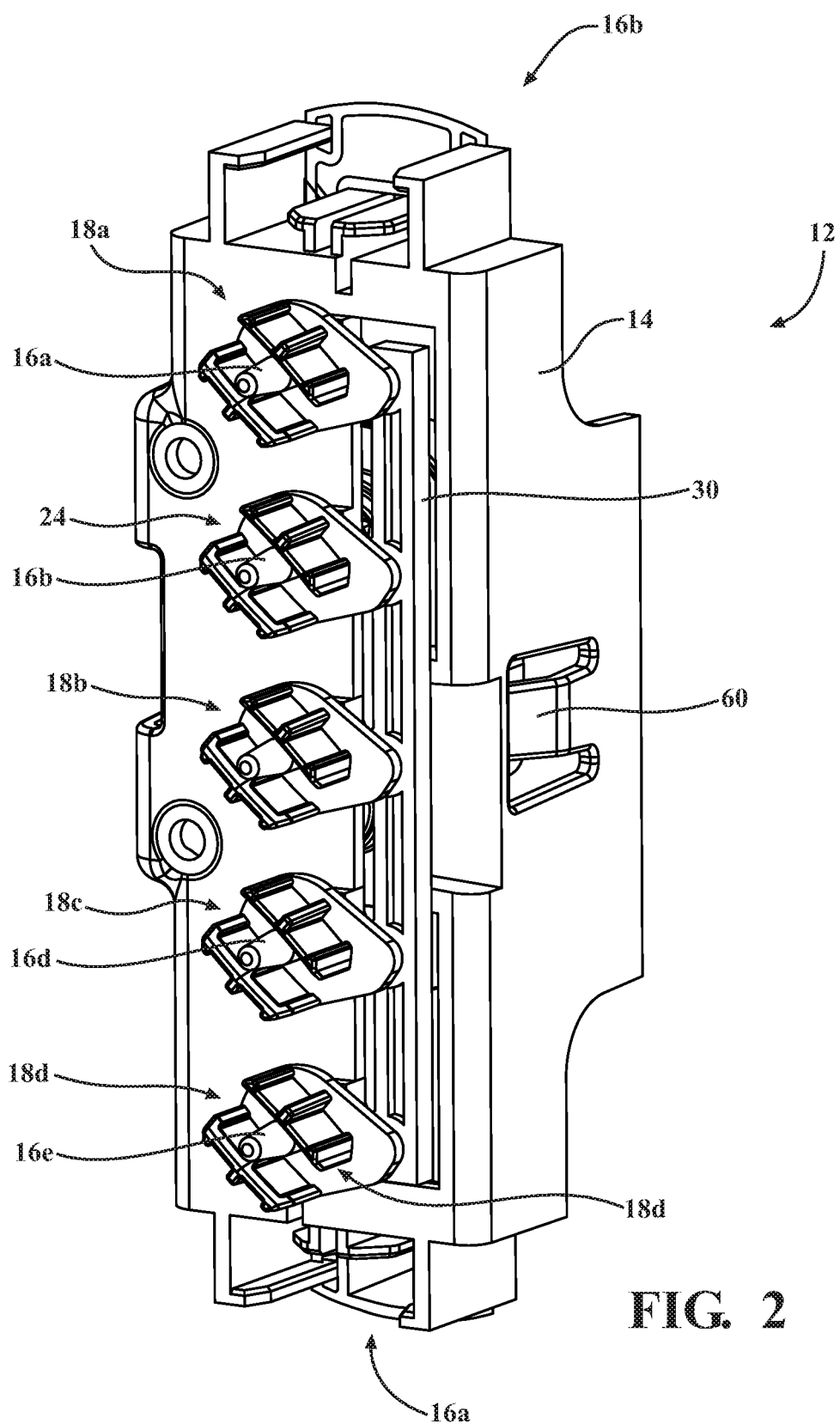
FIG. 2 is an enlarged front perspective view of the integrated end cap with the vanes removed.
Figure 3:
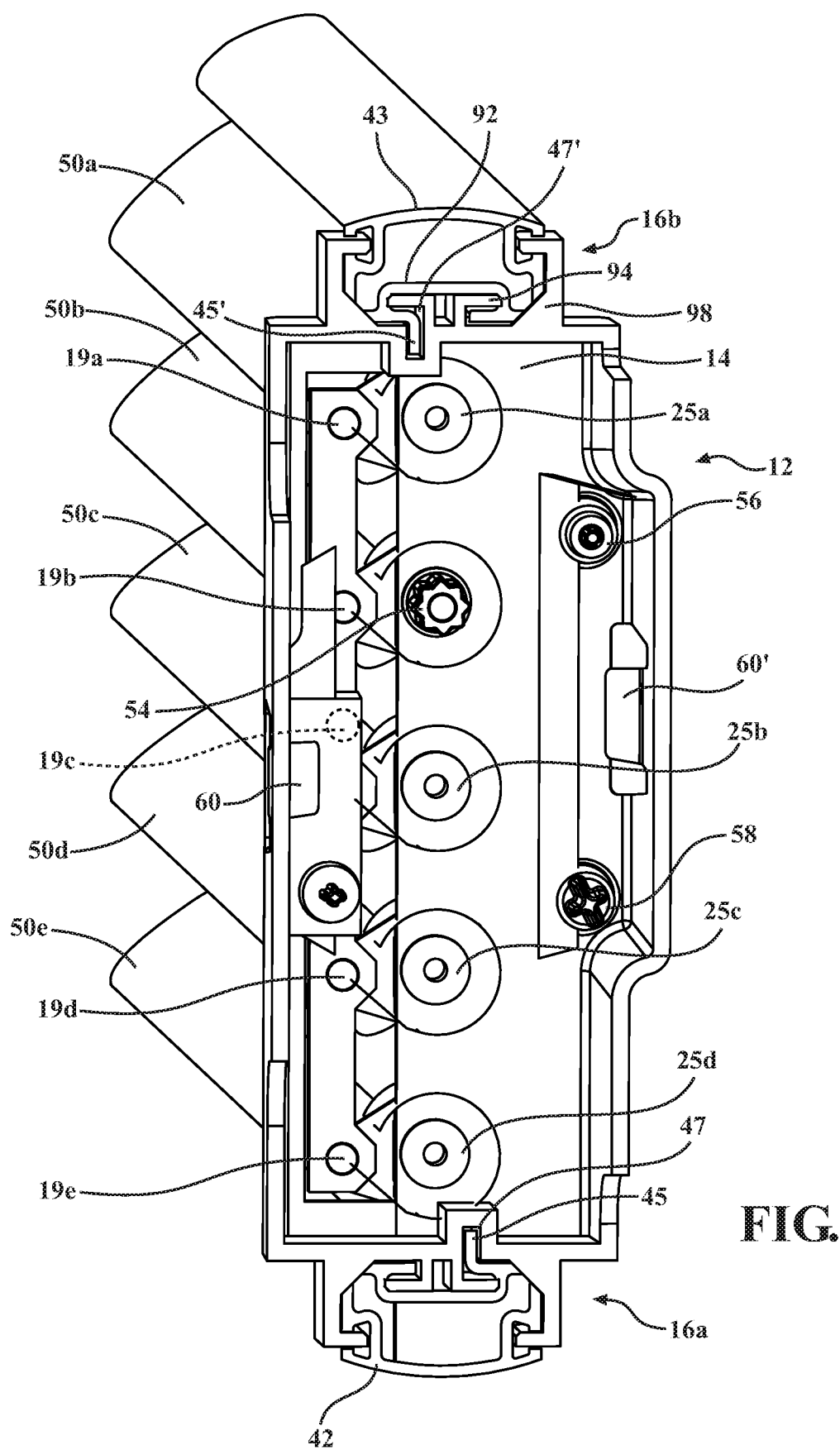
FIG. 3 is an enlarged rear perspective view of the integrated end cap with the motor removed.
Figure 4:
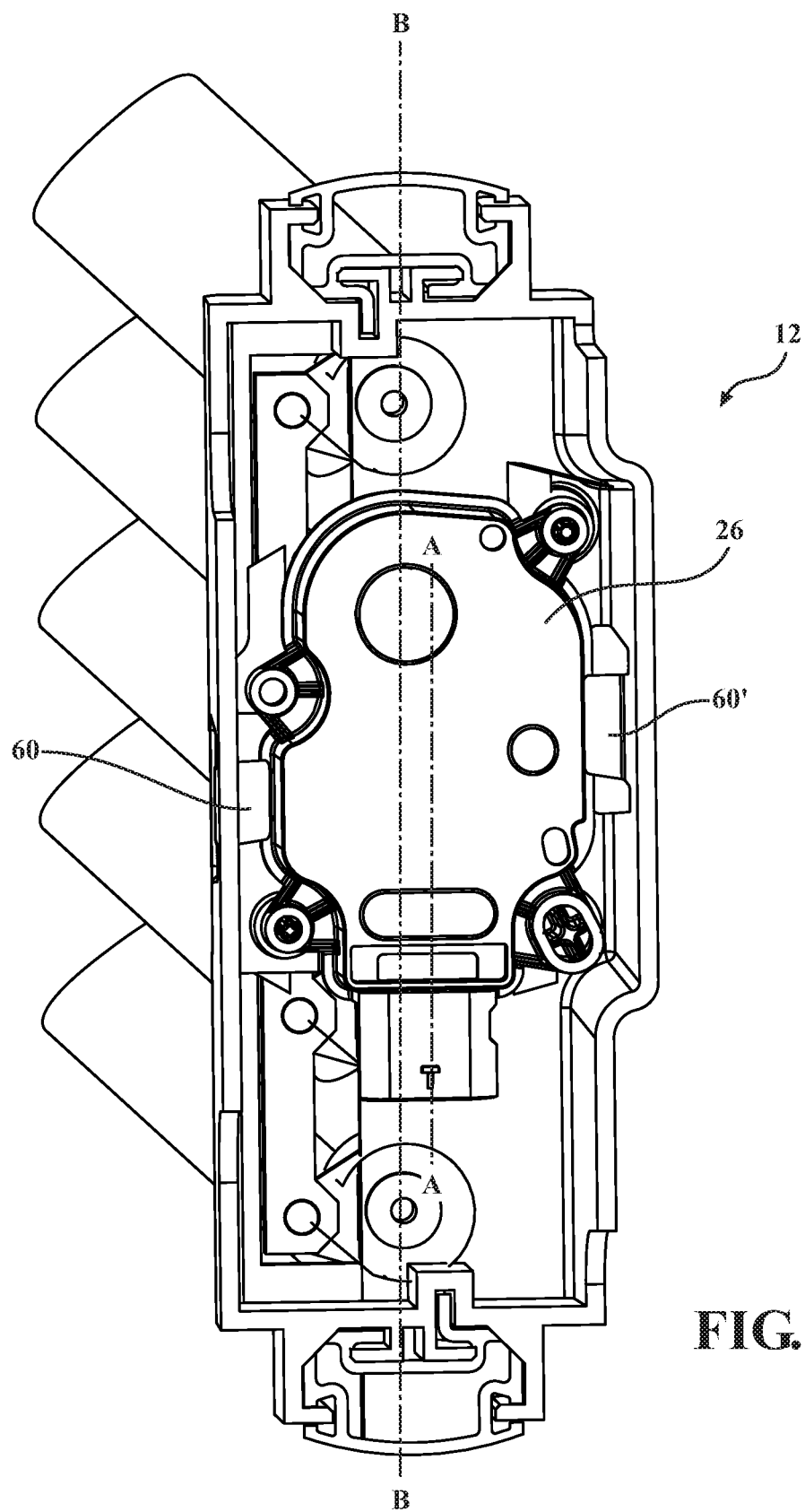
FIG. 4 is an enlarged rear perspective view of the integrated end cap with the motor attached.

Referring to FIGS. 1-4 there is further provided a link arm 30 connected to and extending between each of the driven retainers 18a-d and the drive retainer 24. The link arm 30 transfers rotational torque from the drive retainer 24 to the driven retainers 18a-d. Each driven retainer 18a-d and drive retainer 24 is connected to a link arm 30 and the integrated end cap body 14. As shown in FIG. 3 the drive retainer 24 and driven retainers 18a-d are connected to the link arm 30 with link posts 19a-e which extend through apertures formed on the link arm 30. The link posts 19a-e extend from the end cap connection side 22 of the driven retainer 18a-d and the end cap connection side 28 of the drive retainer 24. The driven retainers 18*a-d* are rotatably connected to the end cap body 14 by driven retainer posts 25*a-d* extending through apertures formed on the end cap body 14.

The AGS 10 further includes a base non-integrated end cap 32 (shown in FIGS. 1, 7 and 26) having a first female key 34*a* at a first end and a second female key 34*b* at a second end. There are also a plurality of posts 36*a-e* equal to both the number of one or more driven retainers 18*a-d* and the drive retainer 24 located on the base integrated end cap 12. As shown in the FIGS. 1-4 the base integrated end cap 12 forms a first side 31 or right side of the AGS 10 as shown in FIG. 1, and the base non-integrated end cap 32 forms a second side 33 or left side of the AGS 10 as shown in FIG. 1.

A top side 38 and a bottom side 40 of the AGS 10 is provided by a set of universal rails. The set of universal rails includes a first universal rail 42 and a second universal rail 43 each having a male key at a first end 44*a*, 44*b* and a male key second end 46*a*, 46*b*. The first universal rail 42 is connected to the first female key 16*a* of the first end of the base integrated end cap 12 at the first end 44*a* of the first universal rail 42. The second end 46*a* of the first universal rail 42 is connected to the first female key 34*a* at the first end of the base non-integrated end cap 32 thereby forming the bottom side 40. The second universal rail 43 is connected to the first female key 16*b* of the second end of the base integrated end cap 12 at the first end 44*b* of the second universal rail 43. The second end 46*b* of the second universal rail 43 is connected to the first female key 34*b* at the second end of the base non-integrated end cap 32 thereby forming the top side 38. Once assembled the active grille shutter system 10 has an aperture 48 formed that is defined by the top side 38, bottom side 40, first side 31 and second side 33.

The first universal rail 42 and second universal rail 43 are formed by extrusion and can be cut to any desired length and connected to the base integrated end cap 12. The first universal rail 42 and second universal rail 43 have an integrated seal fin 45, 45' that is used as an abutment surface for the uppermost vane and lowermost vane of the aperture 48 when rotated to the closed position. The integrated seal fin fits 45, 45' into a respective groove 47, 47' of the first female key 16*a* or second female key 16*b* of the integrated end cap body 14. In prior applications a rubber seal is connected to the top or lower frame piece, however the present invention provides an improvement over the prior methods by integrating the sealing element into the upper frame piece and lower frame piece during the extrusion process, thereby eliminating the need for additional assembly of sealing elements.

During operation air flow through the aperture 48 in a controlled manner due to the rotation of a plurality of base vanes 50*a-e* that extend across the aperture 48 and rotate between an open position where the vanes are generally perpendicular to the aperture 48, a closed position where the vanes rotate to be parallel to and block the aperture 28, or to an intermediate position. Each respective one of the plurality of base vanes 50*a-e* rotatably extends across the aperture 48 and connects at a first end to one of the plurality of posts 36*a-e* of the base non-integrated end cap 32, and at a second end to one of the one or more driven retainers 18*a-d* or the drive retainer 24 of the base integrated end cap 12. The base vanes 50*a-e* are rotated by the respective driven retainer 18*a-d* or drive retainer 24.

Referring now to FIGS. 2-4 and 8A front, rear and cross-sectional views of the base integrated end cap 12 are shown. The drive retainer 24 has a drive post 54 that extends from the end cap connection side 28 of the drive retainer 24, through the integrated end cap body 14 and connects to an actuator 52 that is connected to the integrated end cap body 14. The connection to the actuator 52 can be any suitable connection, however, in the present embodiment of the invention the drive post 54 slides into an aperture of the actuator 52 that has a mated fitting with the drive post 54. The integrated end cap body 14 is sized to hold the actuator 52, shown in FIG. 4. FIG. 3 shows the actuator 52 removed from the integrated end cap body 14 so the connection features can be better seen and described. FIG. 3 shows locator posts 56, 58 extending from the rear surface of the integrated end cap body 14 that align with holes on the housing of the actuator 52 to ensure the actuator 52 is properly aligned with the drive post 54. The actuator 52 is held to or connected to the integrated end cap body 14 by retainer clips 60, 60' integrated or molded into the integrated end cap body 14 that are configured to grasp the housing of the actuator 52 and hold it in place. The use of the retainer clips 60, 60' and the locator posts 56, 58 allow the actuator 52 to be pushed onto the integrated end cap body 14 in a level manner, meaning that a longitudinal axis A-A of the actuator 52 remains parallel to a longitudinal axis B-B of the integrated end cap body 14 during assembly. This is an improvement over prior techniques where the actuator would have to be tilted with respect to the end cap and snapped into place, which can be a disadvantage because it requires more clearance during assembly. During operation the drive retainer 24 will receive the direct rotational force from the actuator 52 and then cause all the driven retainers 18*a-d* to rotate by transferring the rotational force to the driven retainers 18*a-d* through the link arm 30. While the drive post 54 is described as being part of the drive retainer 24 it is within the scope of this invention for the drive post 54 to be part of the actuator 52 or some intermediary component that connects between the actuator 52 and the drive retainer 24.

Figure 5:
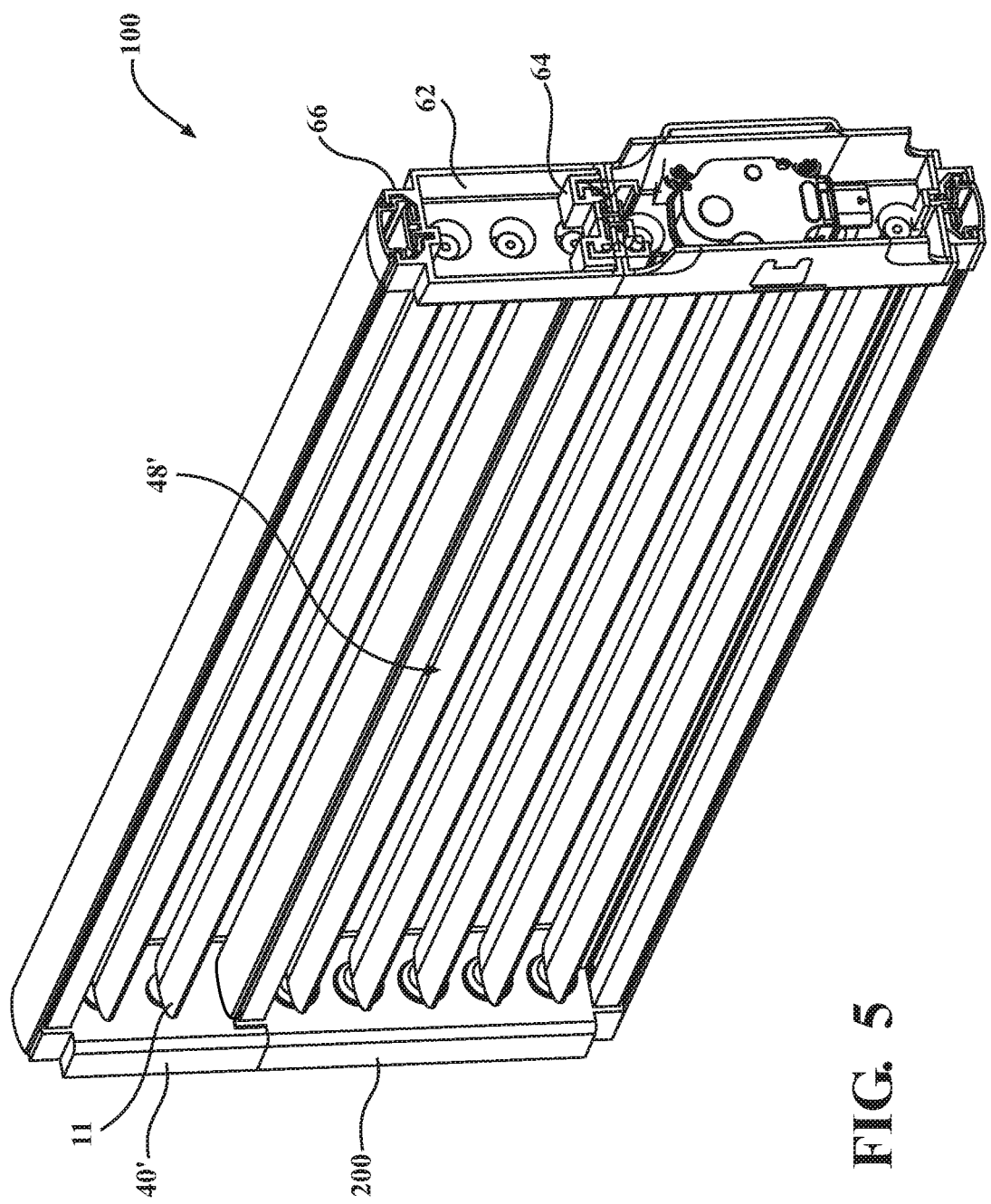
FIG. 5 is a side perspective view of a second embodiment of the invention showing the vertical scalability of the active grille shutter system.
Figure 6:
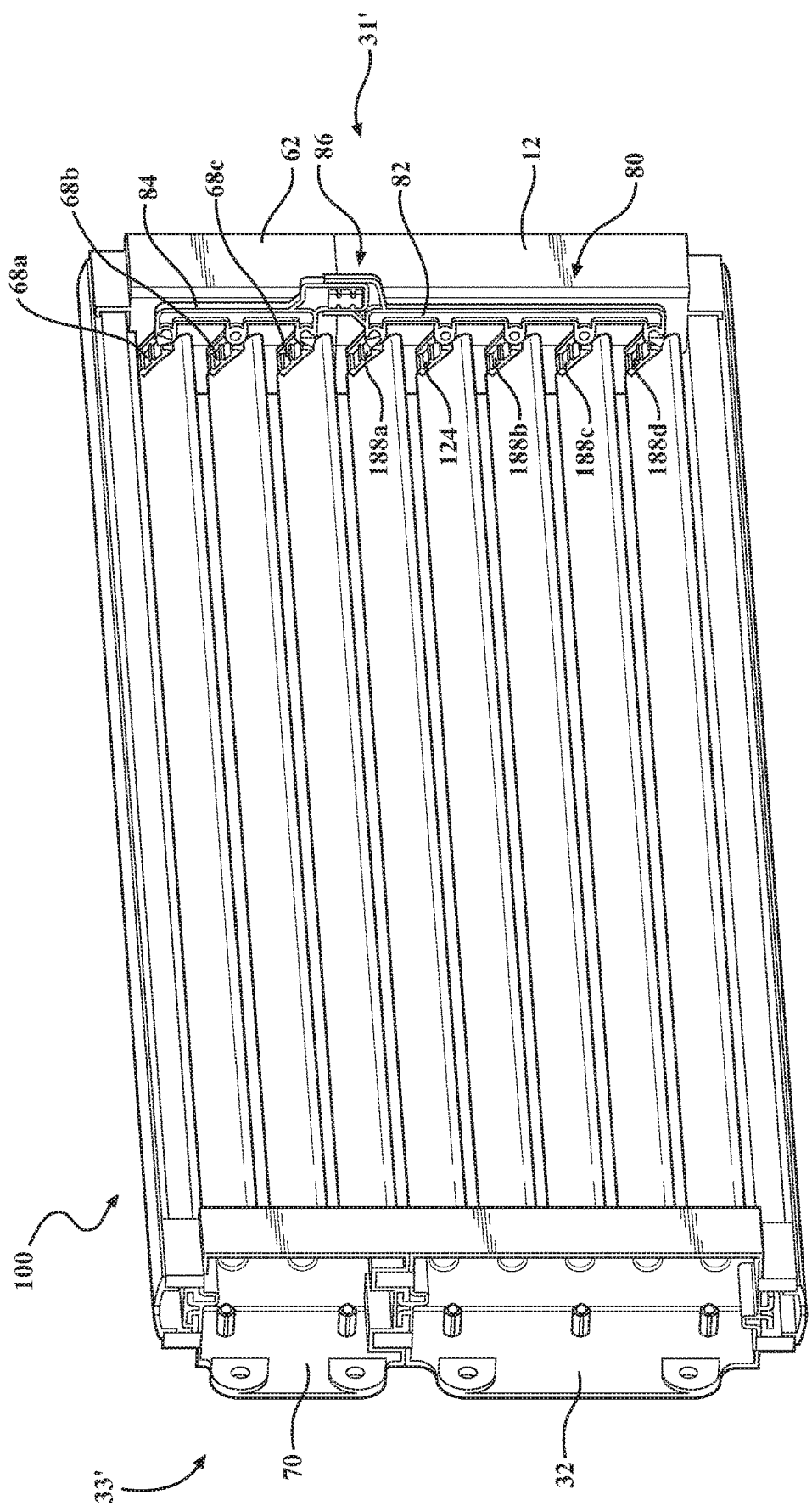
FIG. 6 is another side perspective view of the second embodiment of the invention showing the vertical scalability of the active grille shutter system.
Figure 7:
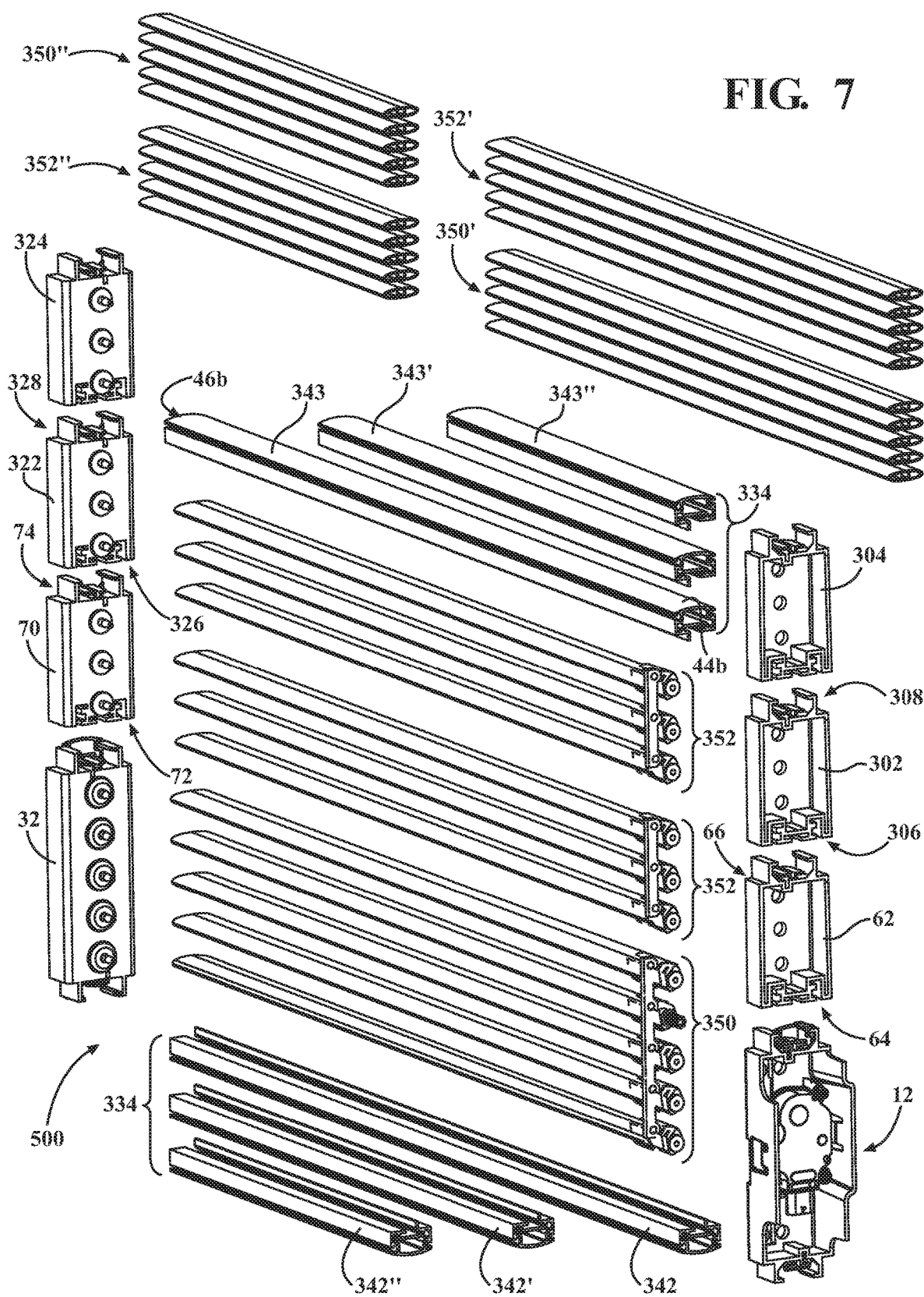
FIG. 7 is an exploded side perspective view of a stock of components used to assemble the active grille shutter systems according to the embodiments of the present invention.
Figure 26:
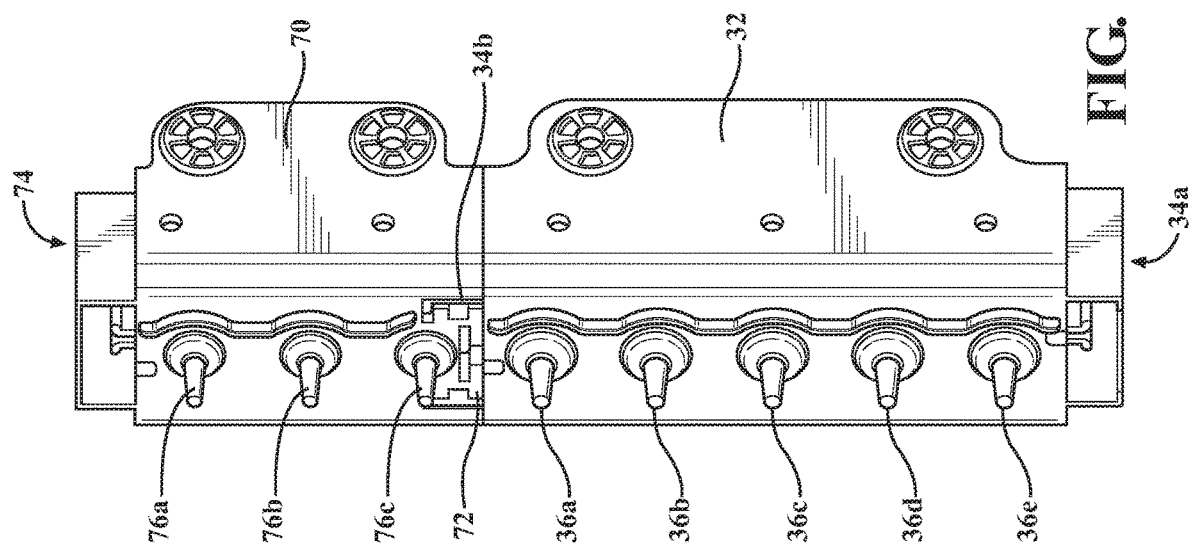
FIG. 26 is a side perspective view of a base non-integrated end cap and post end cap extension.

The AGS 10 of FIGS. 1-4 is modular, meaning that it is assembled from a stock of components that are connectable to allow greater or lesser vertical height and horizontal width through the selection of the stock components, which have different sizes or can be connected together to create longer sides of the AGS. An active grille shutter system (AGS) 100 shown in FIGS. 5-7 demonstrates the modular aspects of the invention by using the components of the AGS 10 as a base structure and then adding to the vertical height of the AGS 10 to form the AGS 100. Like reference numbers from the AGS 10 described above will be carried over to depict the same components used in the AGS 100. The AGS 100 further includes the base integrated end cap 112 having driven retainers 118*a-d* and a drive retainer 124 that have link posts 99*a-h* that are positioned differently and will be described in greater detail below. A driven retainer end cap extension 62 having a male key 64 at a first end and a female key 66 at a second end. Also referring to FIG. 8B there are three driven retainers 68*a-c* each having a vane connection side 20' and an end cap connection side 22' rotatably fixed to the driven retainer end cap extension 62. The male key 64 of the driven retainer end cap extension 62 is connectable to the second female key 16*b* of the base integrated end cap 112 thereby extending the length of a first side 31' of the AGS 100. Similarly a second side 33' of the AGS 100 is extended by using a post end cap extension 70 having a male key 72 at a first end and a female key 74 at a second end, the details of which are best shown in FIGS. 7 and 26. Extending from a side of the post end cap extension 70 are three posts 76*a-c* equal to the number of one or more driven retainers 68*a-c* of the driven retainer end cap extension 62. The male key 72 of the post end cap extension 70 connects to the second female key 34*b* of the base non-integrated end cap 32.

In this embodiment of the invention the second universal rail 43 is disconnected and moved upward to connect to the female key 74 at the first end 44*b* and the female key 66 at a second end thereby forming an aperture 48' that is larger than the aperture 48. A plurality of extension vanes 78*a-c* extend across a portion of the aperture 48' that has been enlarged by the addition of the driven retainer end cap extension 62 and the post end cap extension 70. Each one of the plurality of extension vanes 78*a-c* connects at a first end to one of the plurality of posts 76*a-c* of the post end cap extension 70 and at a second end to one of the driven retainers 68*a-c* of the driven end cap retainer extension 62.

In FIG. 2 the AGS 10 the link arm 30 is a single piece link arm that connected to the driven retainers and drive retainer 24. In the present embodiment of the invention, the AGS 100 has a link arm 80 that has two link arm pieces that include a first arm 82 of the two link arm pieces that connects to the driven retainers 118*a-d* and drive retainer 124 however, the first arm 82 is modified to link with a second arm 84 of the two link arm pieces. The second arm 84 of the two link arm pieces is connected to the driven retainers 68*a-c*. The details of the link arm 80 is are shown in FIGS. 6, 7, 13, 18A and 20-22. The first arm 82 and the second arm 84 are joined by a link hitch 86. The link hitch 86 includes a snap fitting provided by a slot 88 formed on the first arm 82 of the two link arm pieces that receives a tab 90 formed on the second arm 84 of the two link arm pieces. Rotational force from the drive retainer 124 is transferred to all the driven retainers 118*a-d*, 68*a-c* through the link arm 80. The use of the two link arm pieces allows the base integrated end cap 112 to be formed separately from the driven end cap retainer extension 62 and then be connected together when the driven end cap retainer extension 62 is connected to the base integrated end cap 112. While the link arm 80 is depicted with a single link hitch 86 it is within the scope of the invention for additional pieces to be connected with the link arm using additional link hitches.

Figure 22:
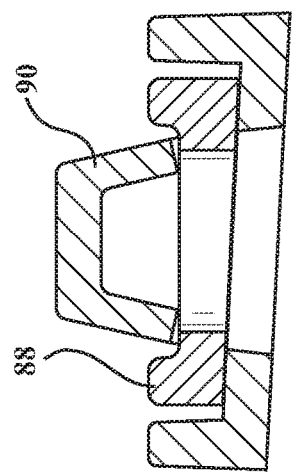
FIG. 22 is a side plan cross sectional view of the link hitch.
Figure 20:
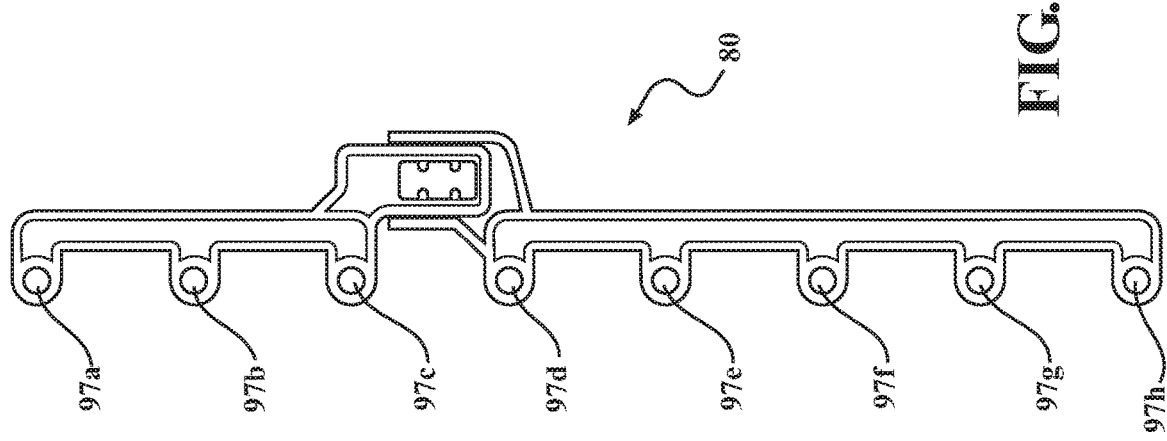
FIG. 20 is a side plan view of the two piece link arm piece connected with a link hitch.

Referring now to all the figures with specific reference to FIGS. 18A, 18B and 20-22 the details of the link arm 80 is now shown and described. The first arm 82 and the second arm 84 connect the drive retainer 24 with driven retainers in the driven end cap extension 62 and additional driven retainer end cap extensions described in greater detail with respect to FIG. 7. This further allows a single actuator to drive vanes that are part of other driven end cap extension. The first arm 82 and second arm 84 are joined by a link hitch 86 that has a slot 88 on second arm 84 that receives a tab 90 on first arm 82. It is within the scope of this invention for the slot 88 to be located on the first arm 82 and the tab 90 to be located on the second arm 84. The tab 90 is held there by a snap fitting as shown in FIG. 22. During formation of the integrated end cap and link arm, the first arm 82 and second arm 84 are formed separate from each other and then snapped together using the slot 88 and tab 90 of the link hitch 86. While a single link hitch 86 is shown it is within the scope of this invention for multiple link arm pieces to be connected using multiple link hitches.

Figures 12A, 12B:
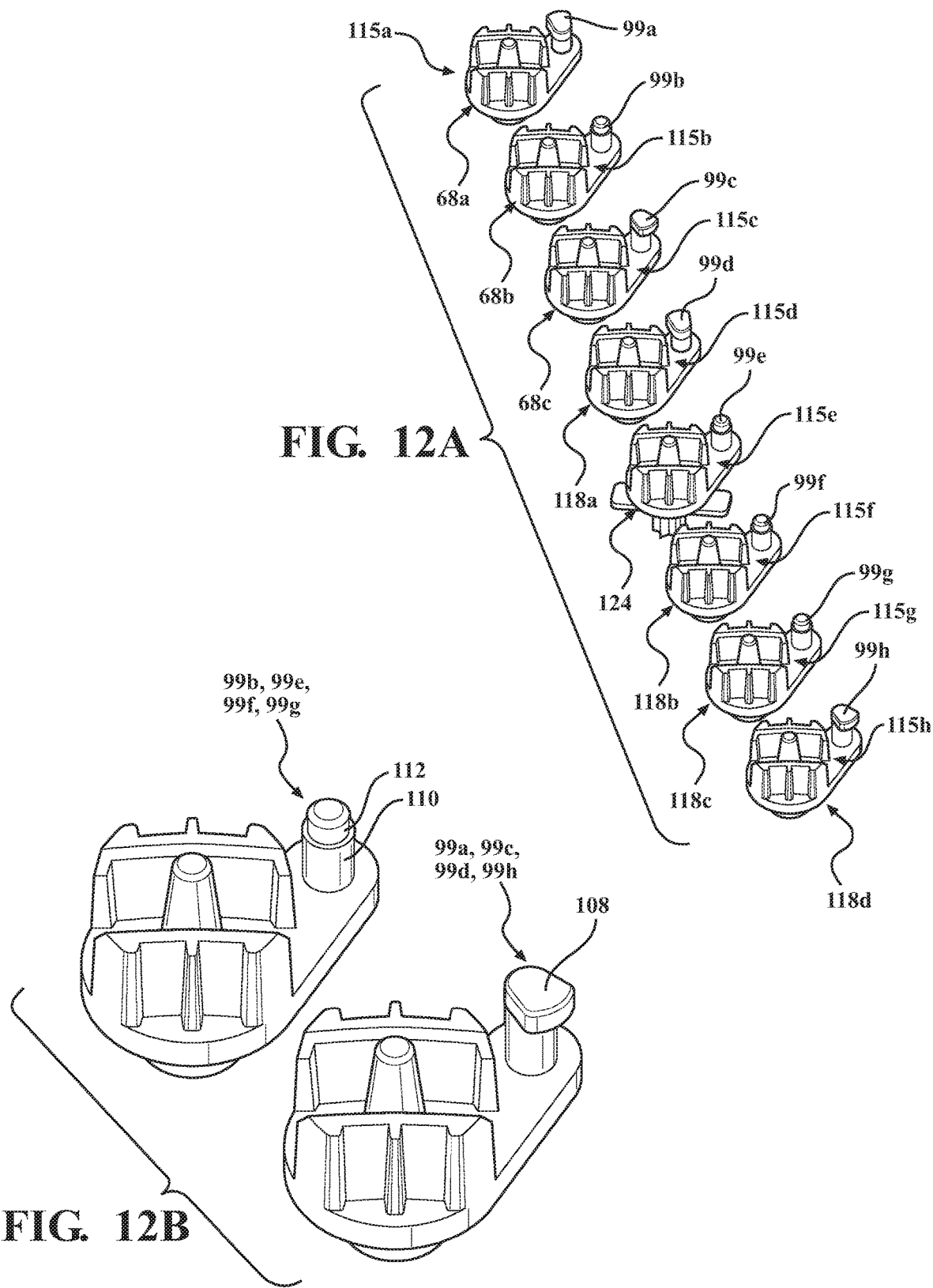
FIG. 12A is a side perspective view of the driven retainers and drive retainer with vane posts on vane connection side according to an additional aspect of the invention.
FIG. 12B is an enlarged side perspective view of the driven retainers and drive retainer with the vane posts according to an additional aspect of the invention.

The link arm 80 also has several link post apertures 97*a-h* that are configured to receive the respective link posts 99*a-h* (shown in FIG. 12A). Referring now to FIG. 22*b* there is a close up view of the link post aperture 97-*a-h*, which will be compared with prior art FIG. 19, which shows a link post aperture 2 that is also capable of connecting to the link posts 99*a-h* in certain applications. The link post aperture 2 of the has an aperture diameter of about 5 mm with a 5° draft side wall 5 that extends between a first side 6 and second side 8. The link post aperture 97*a-h* differs from the link post aperture 2 in that there is a straight side wall 102 without a draft between a first side 104 and second side 106. Also, the diameter of the link post aperture 97*a-h* is a constant 5.5 mm which allows the link arm 80 to float vertically along the axis of the respective link posts 99*a-h* as described above. While the design of link post aperture 97*a-h* is desired for several applications, it is within the scope of this invention for certain applications or designs to use the link post aperture 2, where a different type of fit between the link posts 99*a-h* and link post aperture 2 is desired.

Referring now to FIGS. 8A, 8B, 15 and 16 the location of the link arm 30 connection to the drive retainer 24 and driven retainers 18*a-d* is different than the location of the link arm 80 connection to the drive retainer 124 and driven retainers 118*a-d*, 68*a-c*. In these figures, link arm 30 and link arm 80 are not shown to better illustrate the spacing between the various components. Link arm 30 connects to the driven retainers 18*a-d* on end cap connection side 22 and drive retainer 24 on the end cap connection side 28. The link arm 80 connects to the drive retainer 124 on vane connection side 26' and driven retainer 118*a-d*, 68*a-c* on the vane connection side 20'. When the link arm 80 (show in FIG. 6) is connected to the vane connection side 20', 26' instead of the end cap connection side 22', 28' a gap 123 between the end cap connection side 22' 28' is reduced because less clearance is needed between the end cap connection side 22',28 and the integrated end cap body 114 or driven end cap retainer extension 62. By comparison a gap 23 between the integrated end cap body 14 and the driven retainers 18*a-d* and drive retainer 24 is greater than gap 123 because more room is required for link arm 30 to be positioned in the gap 23. The gap results in more air leakage through the AGS 10 then would leak through AGS 100. However, some applications may require the link arm 30 to be connected to the end cap connection side 22, 28 in certain design applications.

Referring now to FIGS. 12A and 12B each of the details of the driven retainers 118*a-d*, 68*a-c* and drive retainer 124 of the AGS 100 is now described. The link posts 99*a-h* extend from the vane connection side 20' and are adjacent clamp surfaces 115*a-h*. The driven retainers 118*a-d*, 68*a-c* have one of two different style link posts depending on the location when connected to the link arm. Link posts 99*a*, 99*c*, 99*d*, 99*h* are link posts that have an L shaped cross-section having a flange 108 (shown in FIG. 12B) that wraps around and locks onto the drive link 80 during the molding process. Link posts 99*a*, 99*c*, 99*d*, 99*h* of this particular style is used at the ends of the link arm 80, thereby allowing the link arm to move loosely on all the link posts (in the left to right direction shown in FIG. 17), while the flange 108 prevents the link arm 80 from coming off each link posts 99*a-h*. Link posts 99*b*, 99*e*, 99*f*, 99*g* have as shown in FIG. 12B, a constant diameter portion 110 of about 5.5 mm in diameter that tapers to a reduced diameter portion, which will be referred to as an undercut 112 of about 3 mm in diameter at the end of the link posts 99*b*, 99*e*, 99*f*, 99*g*. During molding of the link posts 99*b*, 99*e*, 99*f*, 99*g* through the link arm (or vice versa) the undercut 112 prevents the end of the link posts 99*b*, 99*e*, 99*f*, 99*g* from becoming flat and sticking to the link arm 80, which can hinder rotation between the link arm and the link posts 99*b*, 99*e*, 99*f*, 99*g*.

Figure 15:
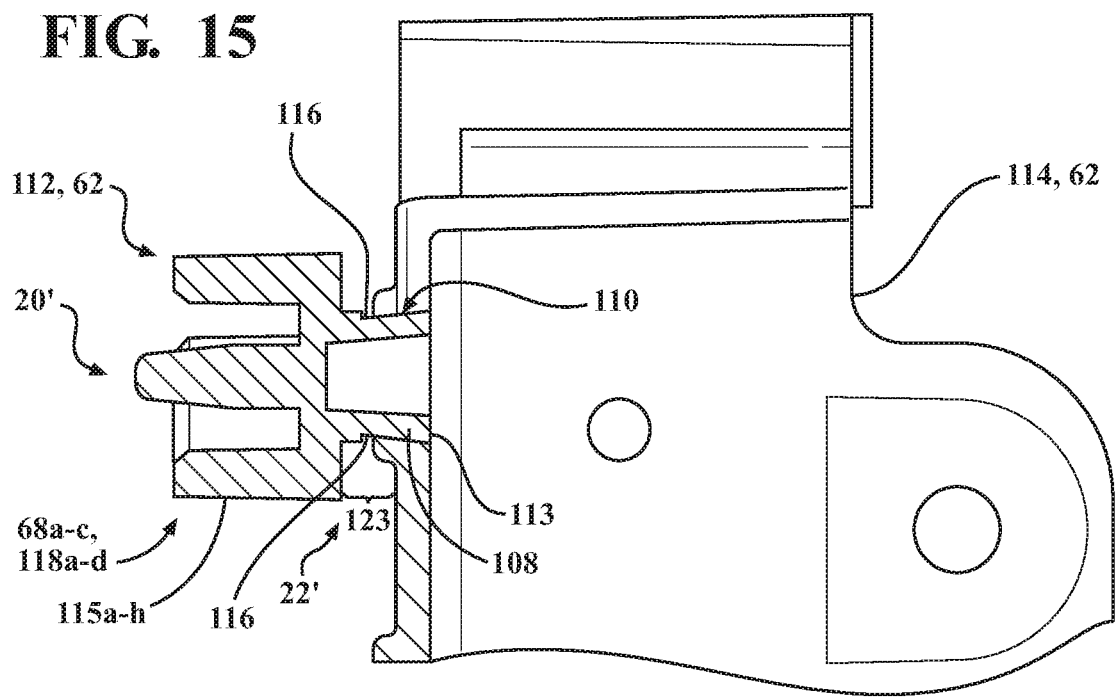
FIG. 15 is a cross-sectional side plan view of the driven retainer.

Referring now to FIG. 15 a generic view of the driven retainers 68*a-c*, 118*a-d* connected to a respective base integrated end cap 112 or driven end cap retainer extension 62 is shown. The driven retainer 68*a-c*, 118*a-d* each include a tapered shaft 108 that is formed through an aperture 110 of the integrated end cap body 112 or driven end cap retainer extension 62. The tapered shaft 108 has a wider end 113 at the portion that fits into the aperture 110 and a narrow end 116 to form a gap 123 between the side of the aperture 110 and the vane clamping surface 115*a-h*. The wider portion of the tapered shaft 108 locks the driven retainer 68*a-c*, 118*a-d* rotatably in place in the aperture 110 during the molding process, while the gap 123 allows the driven retainers 68*a-c*, 118*a-d* to be slightly pushed during assembly along the rotational axis of the tapered shaft 108 to move the driven retainers 68*a-c*, 118*a-d* slightly toward the integrated end cap body 114 and breakaway the second shot of material from the first shot of material and allow the driven retainer 68*a-c*, 118*a-d* to begin rotating freely in the aperture 110, while the wider portion of the tapered shaft 108 prevents the driven retainer 68*a-c*, 118*a-d* from falling out of the aperture 110, thereby making the driven retainer 68*a-c*, 118*a-d* rotatably locked to the integrated cap body 112 or driven end cap retainer extension 62. In one embodiment of the invention described above the first shot and second shot are different materials and the second shot is selected to shrink slightly during curing so that the tapered shaft 108 will be cured in a manner that rotation of the tapered shaft 108 in the aperture 110 will be possible. In another embodiment of the invention using Polypropylene-GF and Polyamide-GF the materials have a similar shrink rate. The gap 123 allows for use of two shots having similar shrink rate materials by providing separation between the driven retainers 68*a-c*, 118*a-d* and the driven end cap retainer extension 62 or the integrated end cap body 114, so that the two pieces do not become locked or stuck together.

Figure 16:
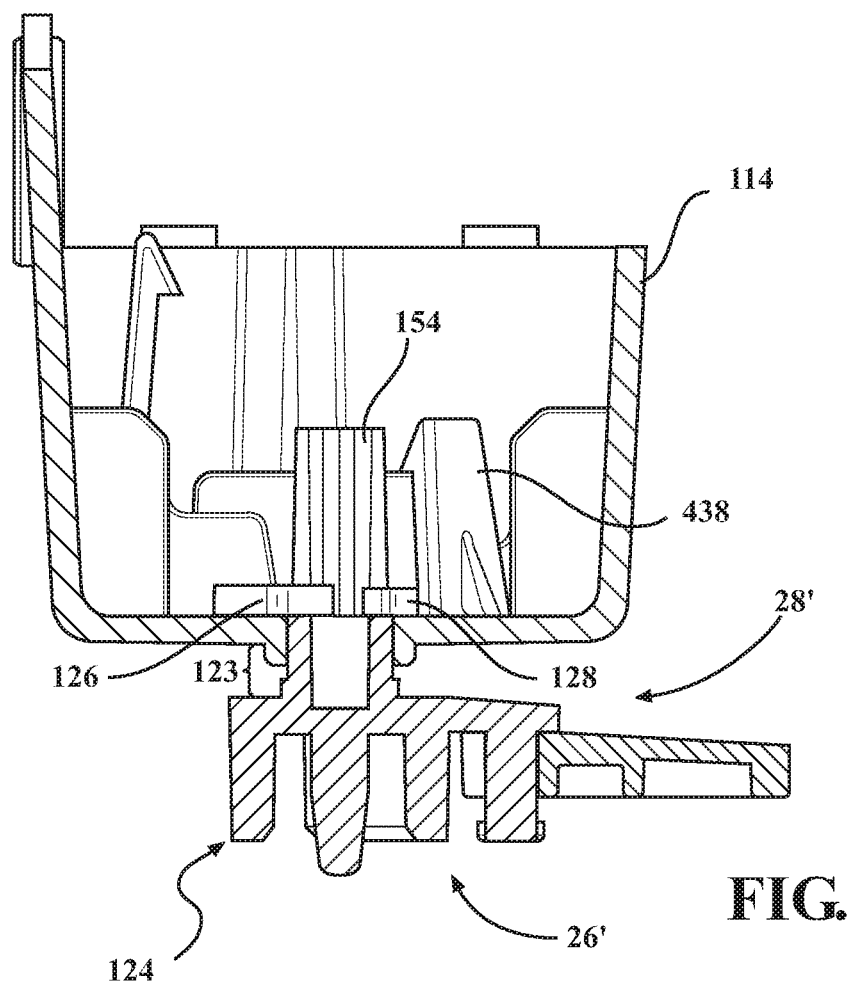
FIG. 16 is a cross-sectional side plan view of the drive retainer.

Referring now to FIG. 16 further details of the drive retainer 124 are shown. The drive retainer 124 is a driven vane meaning that it is connected to an actuator (not shown) using a drive post 154 integrally formed thereon and extending from the endcap connection side 28'. Formed at the base of the drive post 154 and extending away from the drive post are two blades 126, 128 that rotate with the drive post 154 and contact one or more stops 130 formed on the surface of the integrated end cap body 114. The two blades 126, 128 and the one or more stops 130 prevent the drive retainer 124 and the driven retainers 118*a-d*, shown in the other drawings connected to the drive retainer 124, from rotating beyond a desired degree of rotation.

Figure 23:
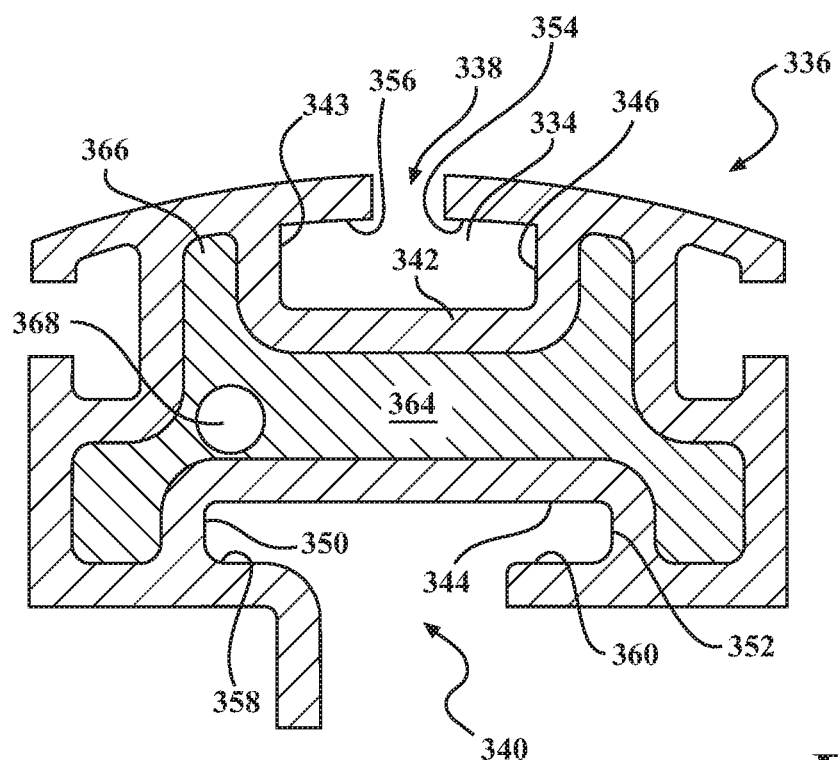
FIG. 23 is a cross sectional side plan view of a universal rail according to an alternate embodiment of the invention.

In another aspect of the invention depicted in FIG. 23 a universal rail 336 according to an alternate embodiment of the invention. The universal rail 336 can be used in place of the universal rails found in the other embodiments of the invention. The universal rail 336 has a top key 338 and a bottom key 340, each having a "T" shaped cross-section with a base surface 342, 344, side walls 343, 346, 349, 351 extending perpendicular from the respective base surface 342, 344 and an aperture surface 354, 356, 358 and 360 that define an aperture. The shape of the top key 338 allows for connection with other components that have either a mating T shaped member or fastener that can slide into the top key 338 and be locked in place. The other components include, but are not limited to shrouds, additional vehicle body attachments, sensors, a vane deflection bracket or anything else that would be desirable to mount at the perimeter of the active grille arrangement 300.

The shape of the bottom key 340 allows the angled wedge 94 (shown in FIG. 25) of the female keys to slide into the bottom key 340 with a mated fit. The universal rail 336 is formed by extrusion and is cut to a desired length thereby allowing the active grilled shutter arrangement 300 to have virtually any length. The center of the universal rail 336 has a channel 364 that provides strength. Additionally, as shown the channel 364 can optionally be filled with strengthening material 366 such as foam or the channel 364 can be used as a duct for another structure 368 such as a hose or electrical wire depending on the needs of a particular application.

Figure 9:
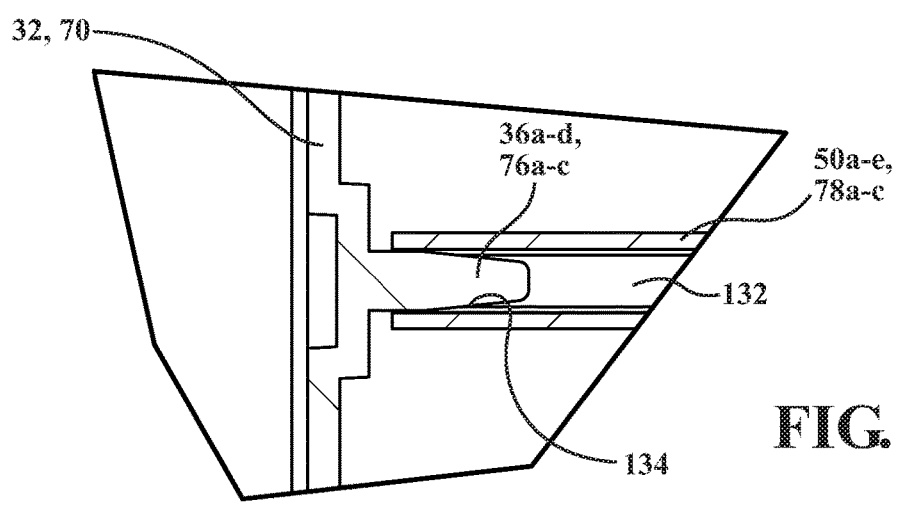
FIG. 9 is an enlarged cross-sectional plan view of the posts of the non-integrated end cap according to both the first and second embodiments of the invention.

Referring now to FIG. 9 a schematic diagram showing a cross section of either the base non-integrated end cap connection 32 and the post end cap extension 70 and the respective base vanes 50*a-e* or extension vanes 78*a-c* will now be described. The following description applies to both AGS 10 and AGS 100 since the base non-integrated end cap connection 32 and post end cap extension 70 is the same for all embodiments of the invention described herein. The posts 36*a-d*, 76*a-c* are configured to slide into the a center channel 132 formed in the cross-section of each respective base vanes 50*a-e* or extension vanes 78*a-c*. The posts 36*a-d*, 76*a-c* allow the respective base vanes 50*a-e* or extension vanes 78*a-c* to rotate about the posts 36*a-d*, 76*a-c*, while supporting the AGS 10, 100. The posts 36*a-d*, 76*a-c* have a tapered surface 134 with the tip being more narrow than the base such that the widest portion of the surface of the post 36*a-d*, 76*a-c* rests against the side of the channel 132 but allows for the respective base vanes 50*a-e* or extension vanes 78*a-c* to rotate about respective the post 36*a-d*, 76*a-c*.

Figure 10:
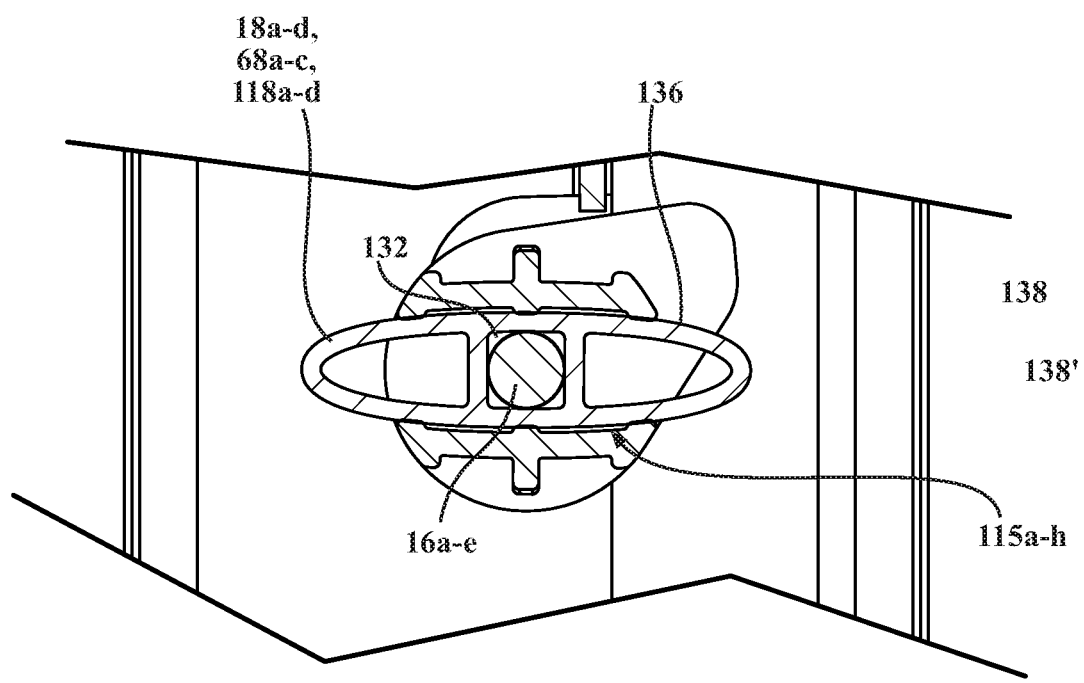
FIG. 10 is an enlarged cross-sectional plan view of the vanes connected to the retainer according to both the first and second embodiments of the invention.
Figure 11A:
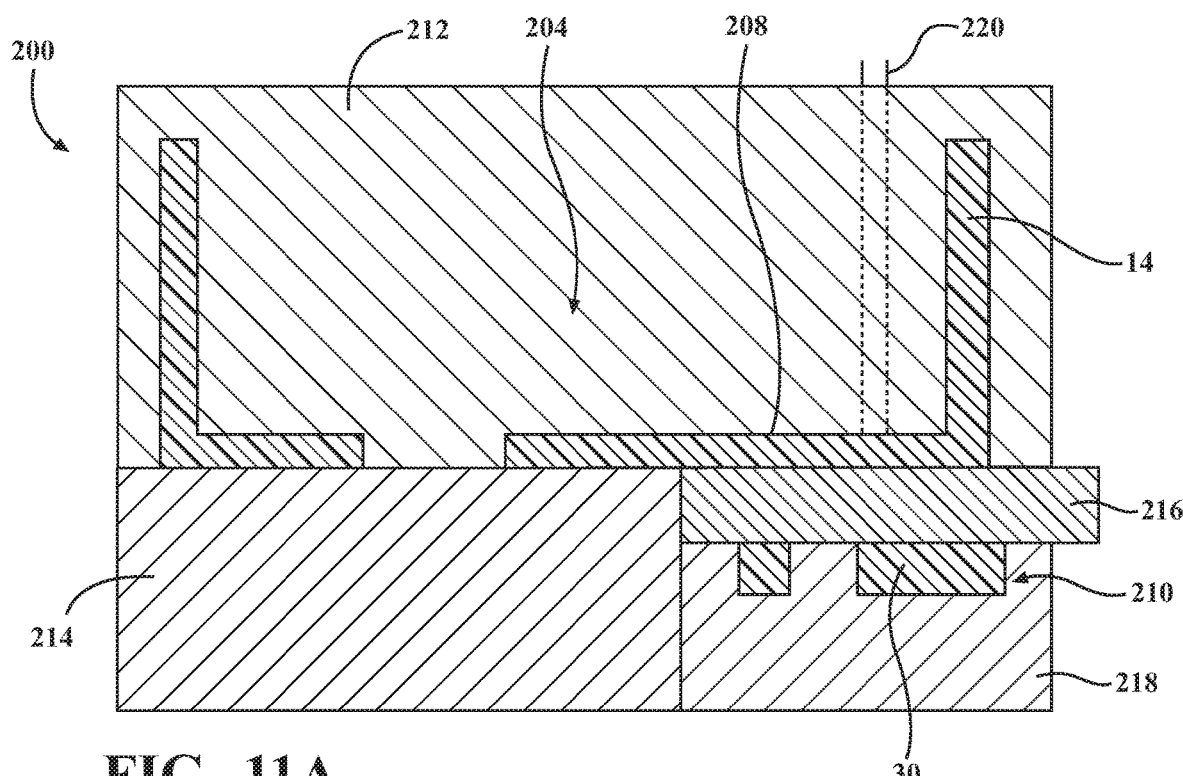
FIG. 11A is a first cross-sectional schematic view of the two shot molding process for forming the base integrated end cap.
Figure 11B:
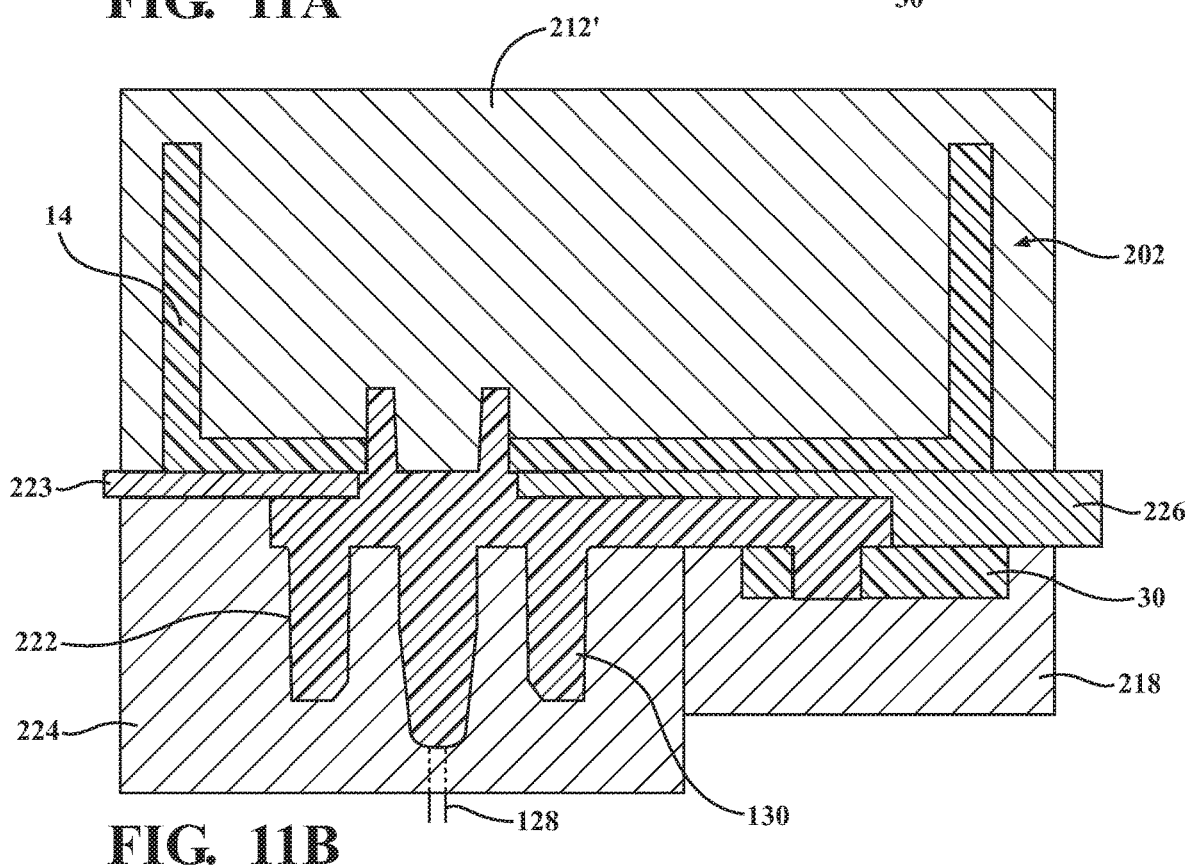
FIG. 11B is a second cross-sectional schematic view of the two shot molding process for forming the base integrated end cap.
Figure 11C:
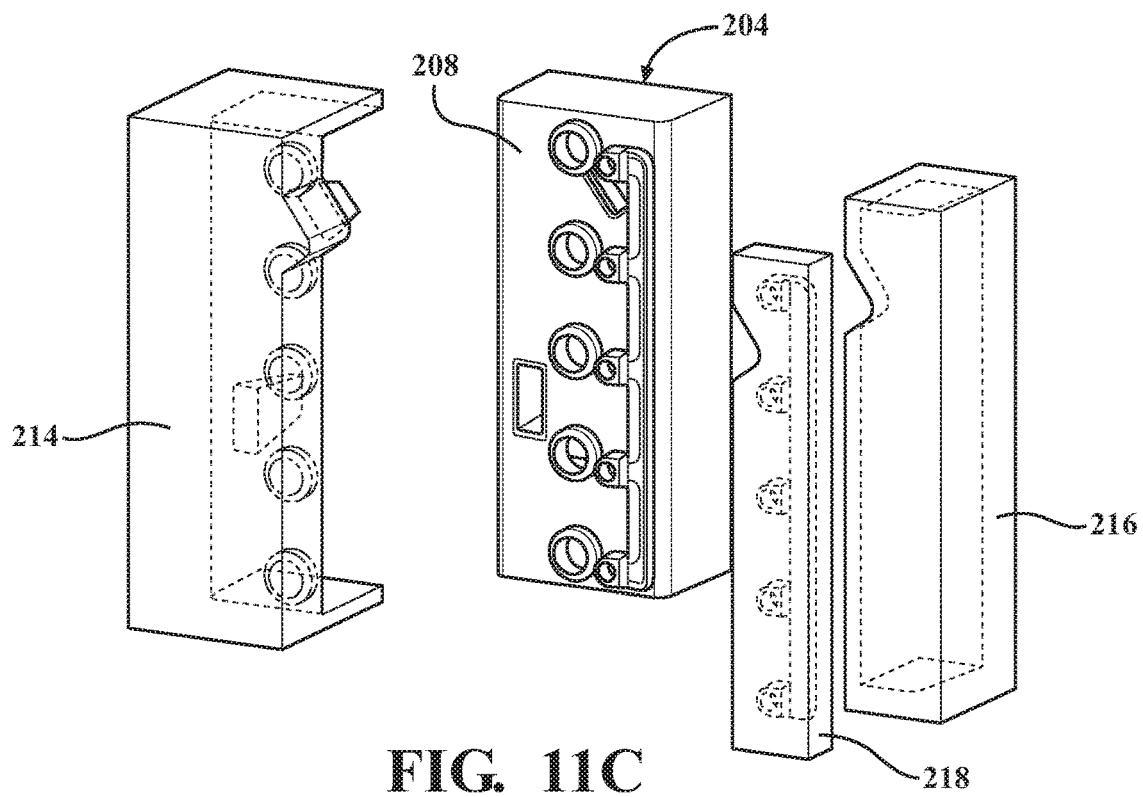
FIG. 11C is a first perspective schematic view of the two shot molding process for forming the base integrated end cap.
Figure 11D:
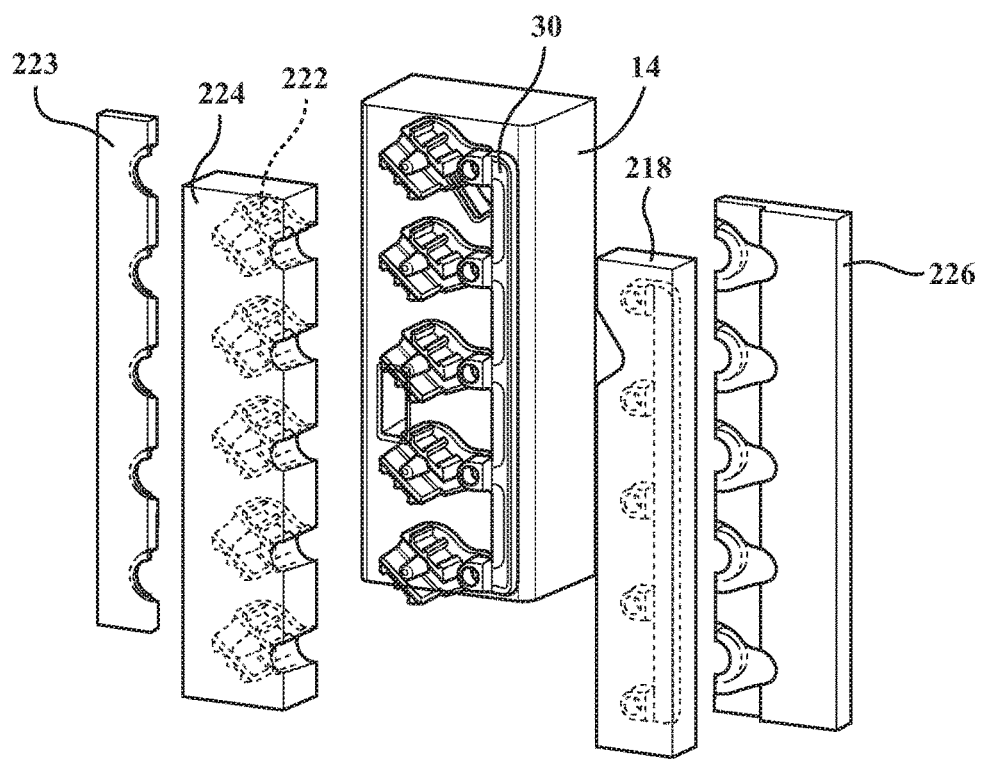
FIG. 11D is a second perspective schematic view of the two shot molding process for forming the base integrated end cap.
Figure 13:
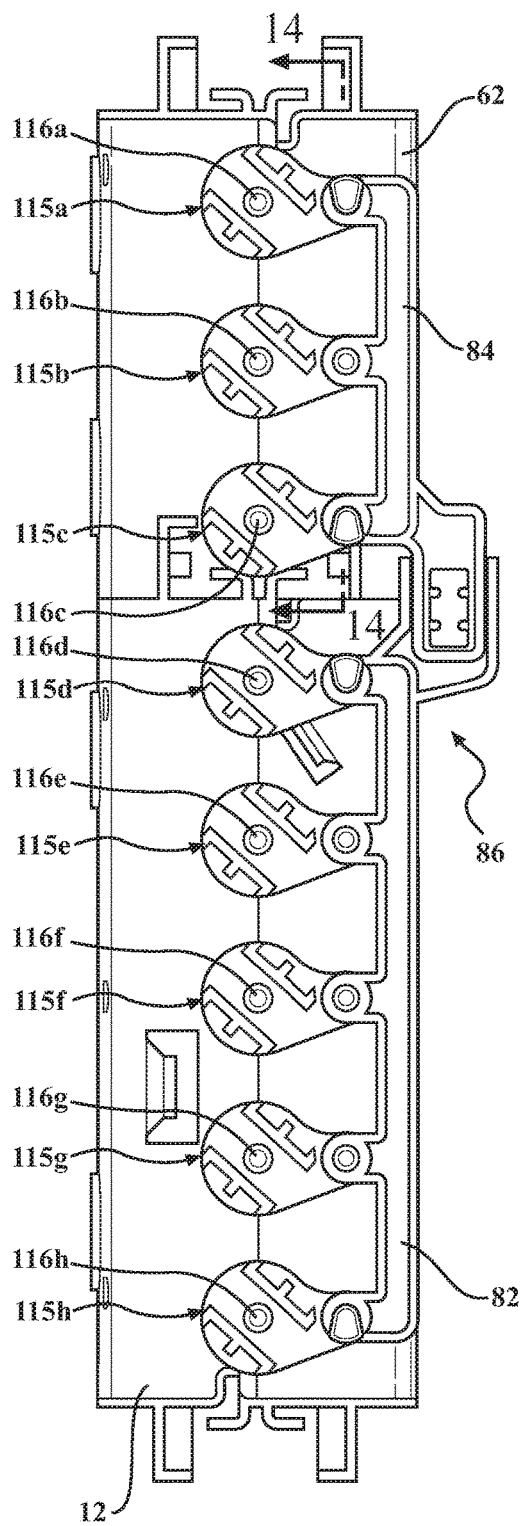
FIG. 13 is a side plan view of two integrated end cap assemblies connected vertically.
Figure 14:
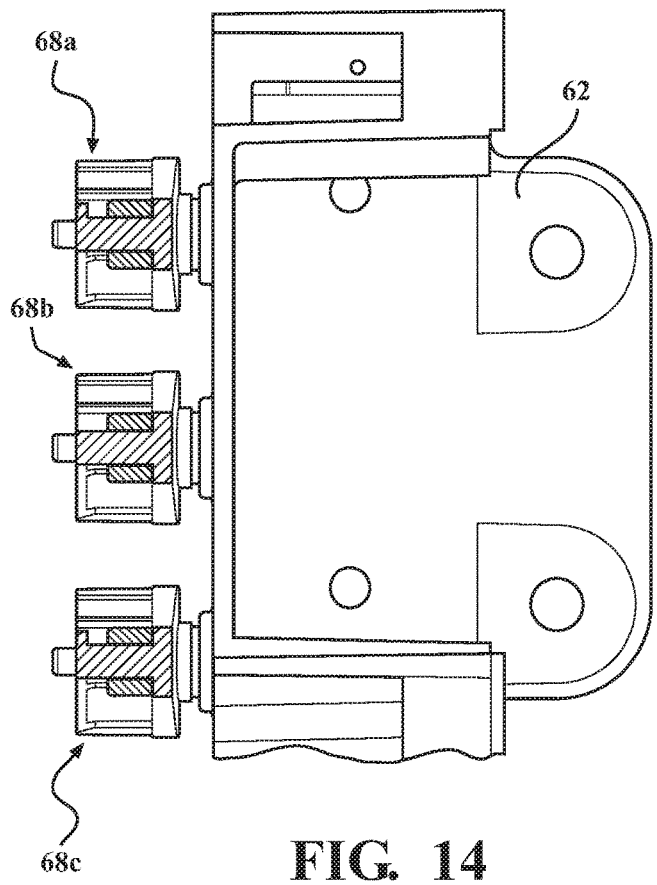
FIG. 14 is a cross-sectional side plan view of a portion of FIG. 13.
Figure 24:
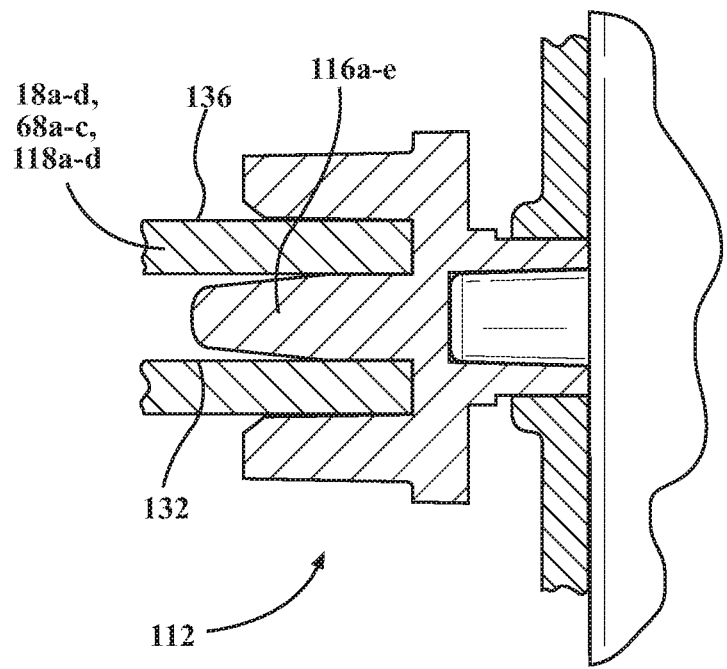
FIG. 24 is a cross-sectional side view of the driven retainers connected to the integrated end cap and a vane.

The opposing side of the base vanes 50*a-e* or the extension vanes 78*a-c* are connected to a respective one of driven retainers 18*a-d*, 68*a-c*, 118*a-d*, all of which have clamp surfaces 115*a-h* and a center post 116*a-e* as shown in FIGS. 10, 13 and 24+. In FIG. 10 the link posts 99*a-h* are not shown because the clamp surfaces 115*a-h* are the same for all embodiments. The base vanes 50*a-e* or the extension vanes 78*a-c* each have an outside surface 136 that the clamp surfaces 115*a-h* grasp the outside surface 136 of the base vanes 50*a-e* or the extension vanes 78*a-c* thereby allowing the base vanes 50*a-e* or the extension vanes 78*a-c* to be simply pushed onto the center post 116*a-e* and held by the clamp surfaces 115*a-h*. The clamp surfaces 115*a-h* have ridges 138, 138' that assist in resiliently gripping the respective base vanes 50*a-e* or the extension vanes 78*a-c*.

Figure 17:
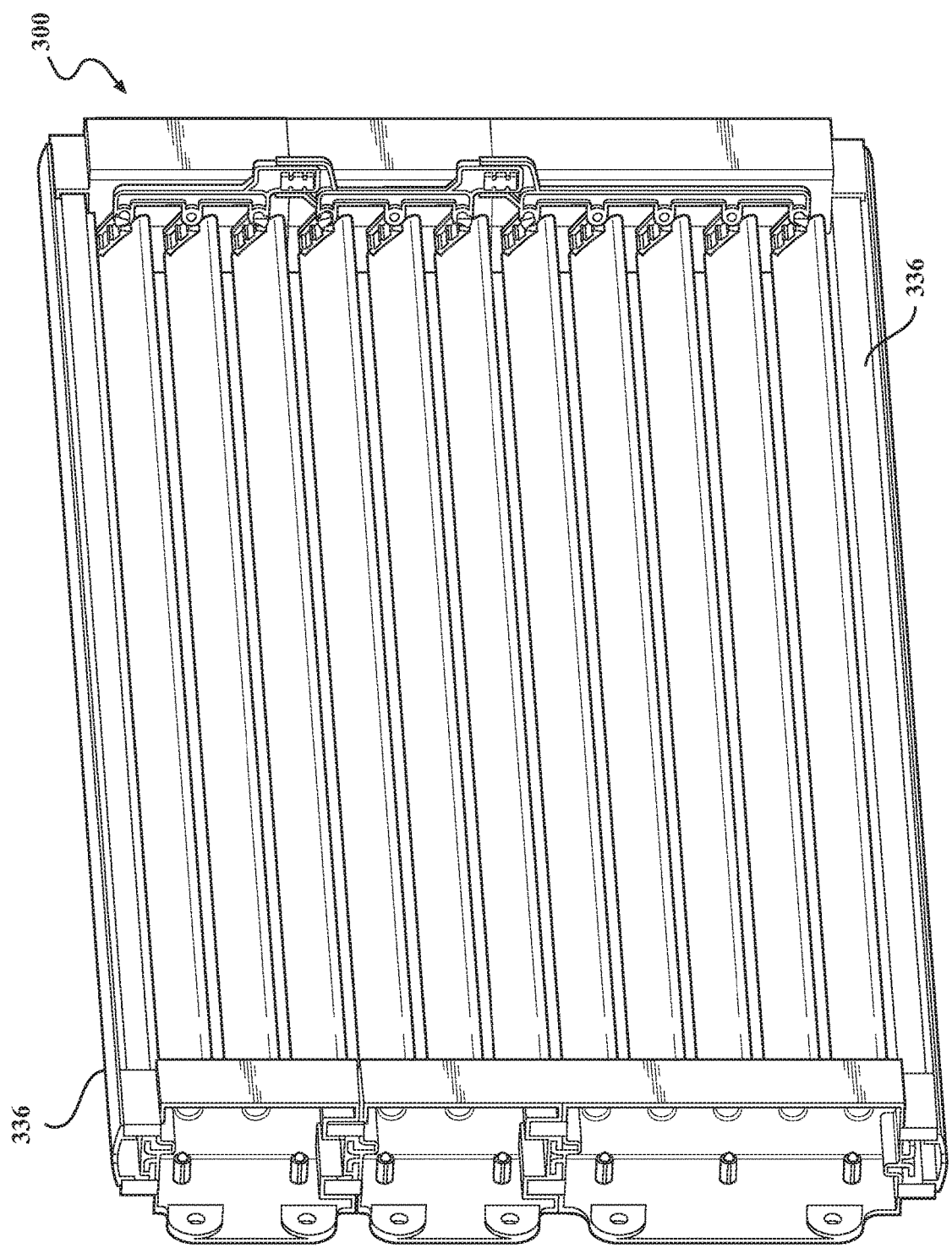
FIG. 17 is a rear perspective view of an active grille shutter system according to an additional embodiment of the invention.
Figure 21:
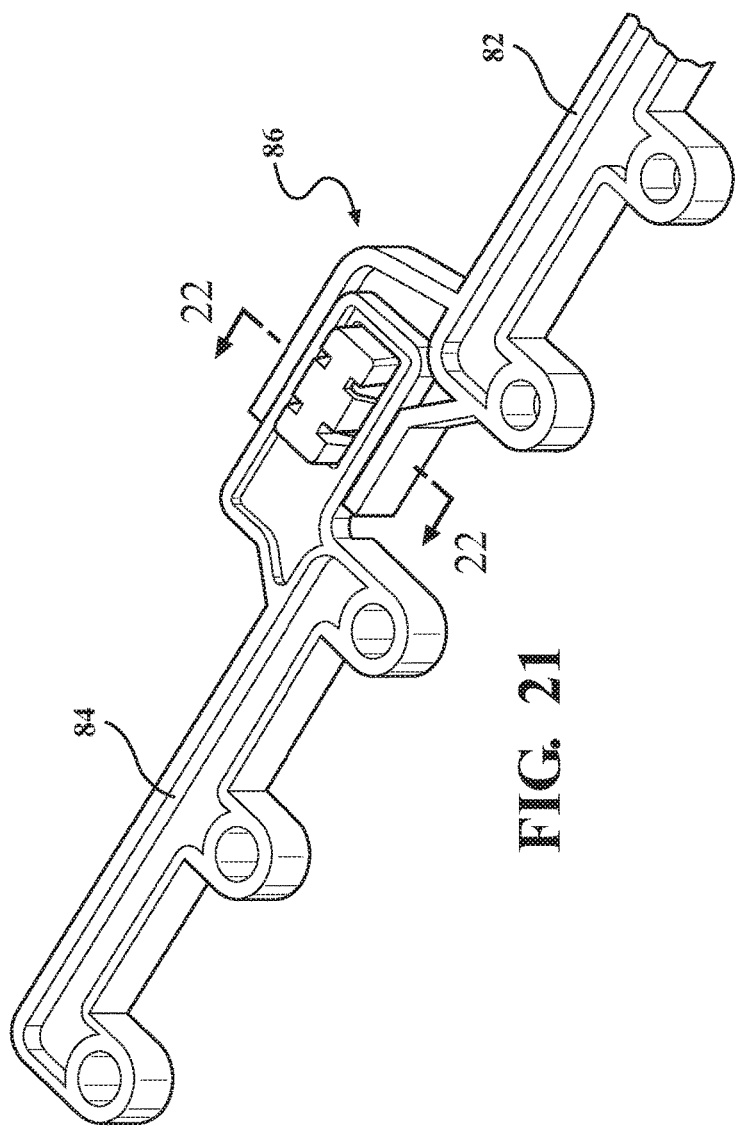
FIG. 21 is an enlarged side perspective view of the link hitch.

FIG. 17 shows an active grille shutter system (AGS) 300 is shown and described in connection with FIG. 7. FIG. 7 depicts the modular aspects of the invention which include a stock of components 500. From the stock of components 500 the AGS 10, 100, 300 are assembled. AGS 300 also uses many of the same components from AGS 100 therefore for both stock components 500 and AGS 300 reference numbers used for components found on AGS 10, 100, 300 have been carried forward to FIGS. 7 and 17. Stock of components 500 include a plurality of additional driven retainer end cap extensions, shown herein as second end cap retainer extension 302 and third end cap retainer extension 304 connectable end to end in series. Second retainer end cap extension 302 has a male key 306 at a first end that is connected to the female key 66 at second end of the first driven retainer end cap extension 62 in place of the second universal rail 43. The second universal rail 43 is connected to the last plurality of additional driven retainer end cap extensions in the series, which in the case of AGS 300 is a female key 308 at a second end of second retainer end cap extension 302. However, if is within the scope of the invention for the third retainer end cap extension 304 or any number of additional end cap extensions to be connected in series, and the second universal rail 43 would be connected at the end of the series. Each of the plurality of additional driven retainer end cap extensions each include one or more driven retainers. As shown in FIG. 17 the second retainer end cap extension 302 has driven retainers 308a-c rotatably connected. AGS 300 further includes a link arm 310 that has a first piece 312, second piece 314 and third piece 316 connected by two link hitches, 318, 320.

Stock components 500 further include a plurality of additional post end cap extensions, shown herein as second post end cap extension 322 and third post end cap extension 324, connectable end to end in series. Second post end cap extension 322 has a male key 326 at a first end that is connected to the female key 74 at a second end of first post end cap extension 70. The second universal rail 43 is connected to the last of the additional post end cap extensions in the series, which in the case of AGS 300 is a female key 328 at a second end of the second post end cap extension 322. It is within the scope of the invention for the third post end cap extension 324 or any number of additional post end cap extensions to be connected in series, and the universal second rail 43 would be connected at the end of the series. Each of the plurality of post end cap extensions each includes one or more posts 330a-c.

Referring now to FIG. 17, connected between the second retainer end cap 302 and the second post endcap extension 322 are three extension vanes 332 a-c. The three extension vanes 332a-c connect to respective driven retainers 308a-c and posts 330a-c in a manner like the AGS 10, 100 described above. The operation of the AGS 300 is like the operation of the AGS 10, 100 described above.

Referring now to FIG. 7 the stock of components 500 includes a plurality of sets of universal rails 334 where a first set 342", 343" of the plurality of sets of universal rails 334 has a length that is shorter than all other plurality of sets of universal rails 334. A second set 342, 343 of the plurality of sets of universal rails 334 has a length that is larger than all the other plurality of sets of universal rails 334. A third set 342', 343' has a length that is longer than the first set 342", 343" and shorter than the second set 342, 343.

The stock components 500 further includes first set 350", second set 350 and third set 350' of base vanes each having a different length, which can be selected to provide a desired vane length for a particular application. The first set 350" has a length that is shorter than the second set 350 and third set 350'. The second set 350 has a length that is larger than the first set 350" and the third set 350'. The third set 350' has a length that is between the first set 350" and the second set 350.

The stock components 500 further includes first set 352", second set 352 and third set 352' of extension vanes each having a different length, which can be selected to provide a desired vane length for a particular application. The first set 352" has a length that is shorter than the second set 352 and third set 352'. The second set 352 has a length that is larger than the first set 352" and third set 352'. The third set 352' has a length that is between the first set 352" and the second set 352.

Figure 25:
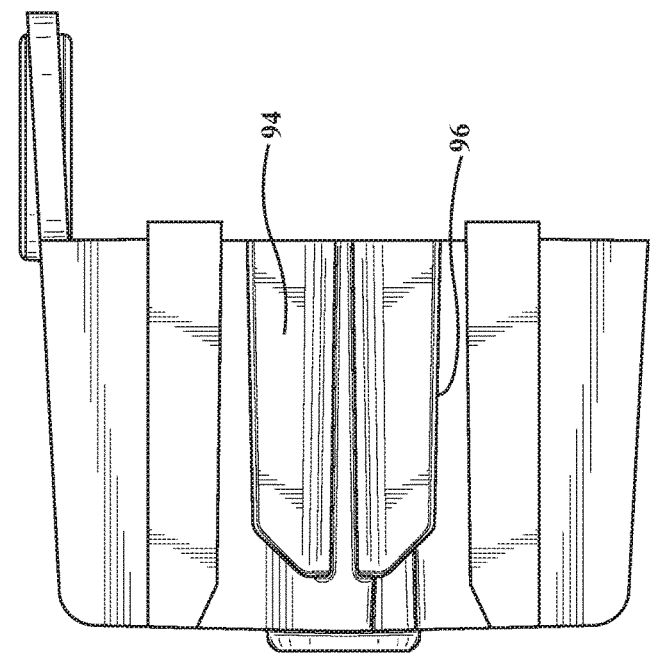
FIG. 25 is a top perspective view of a female key.

Referring now to all the figures female keys used in all the embodiments of the invention have the same configuration and will now be collectively referred to as the female keys. The female keys are used to connect to other frame components of the AGS 10, 100, 300 shaped to have a male key using a friction fit. The male key can take many forms, but will include a slot, like slot 92 on second universal rail 43 that receives an angled wedge 94 that slides into a slot 92. FIG. 25 depicts an overhead perspective view of angled wedge 94 and has an angled edge 96 that creates a friction fit between the angled wedge 94 and the walls of the slot 92. The female keys also all have a stop surface, which is shown in FIG. 3 as stop surface 98 on the second female key 16b that prevents over insertion of the second universal rail 43, but also prevents over insertion of a male key of another component used in place of second universal rail 43.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grille shutter system assembled from modular components comprising:
   a base integrated end cap having a first end and a second end, one or more driven retainers each having a vane connection side and an end cap connection side rotatably fixed to the base integrated end cap, a drive retainer with a vane connection side and an end cap connection side rotatably fixed to the base integrated end cap;
   a driven retainer end cap extension having the one or more driven retainers having a vane connection side and an end cap connection side rotatably fixed to the driven retainer end cap extension, wherein a first end of the driven retainer end cap extension connects to the second end of the base integrated end cap;
   a link arm connected to and extending between each of the one or more driven retainers and the drive retainer;
   a base non-integrated end cap having a first end and a second end, a plurality of posts equal to both the number of one or more driven retainers and the drive retainer located on the base integrated end cap;
   a post end cap extension each having a first end and a second end, and one or more posts equal to the number of one or more driven retainers of the driven retainer end cap extension, wherein the first end of a post end cap extension connects to the second end of the base non-integrated end cap extension;
   a first universal rail and a second universal rail each having a first end and a second end, wherein the first universal rail is connected to the first end of the base integrated end cap at the first end of the first universal rail and the second end of the first universal rail is connected to the first end of the base non-integrated end cap, thereby forming a bottom side of the active grille shutter system and the second universal rail is connected to the second end of the driven retainer end cap extension and the second end of the post end cap extension, thereby forming a top side of the active grille shutter system, wherein an aperture of the active grille shutter system is formed;
   a plurality of base vanes, where each respective one of the plurality of base vanes rotatably extends across the aperture and connects at a first end to one of the plurality of posts of the base non-integrated end cap and at a second end to one of the one or more driven retainers or the drive retainer; and
   a plurality of extension vanes, where each one of the plurality of extension vanes rotatably extends across the aperture and connects at a first end to one of the plurality of posts of the base non-integrated end cap and at a second end to one of the one or more driven retainers of the driven retainer end cap extension.

2. The active grille shutter system of claim 1 further comprising:
   a plurality of additional driven retainer end cap extensions connected end to end in series, wherein one of the plurality of additional driven retainer end cap extensions is connected to the second end of the first driven retainer end cap extension in place of the second universal rail and the second universal rail is connected to the last plurality of additional driven retainer end cap extensions in the series, wherein each of the plurality of additional retainer endcap extensions includes one or more driven retainers;

a plurality of additional post end cap extensions connected to the first post end cap extension, wherein the plurality of additional post end cap extensions connect end to end in series, wherein one of the plurality of additional end cap extensions is connected to the second end of the first post end cap extension in place of the second universal rail and the second universal rail is connected to the last one of the plurality of additional post end cap extensions in the series wherein each of the plurality of additional post end caps includes one or more posts, and wherein the number of extension vanes in each of the plurality of sets of extension vanes further includes the total number of one or more driven retainers in the plurality of additional driven retainer end cap extensions.

3. The active grille shutter system of claim 1, wherein the aperture is defined by the top side, the bottom side, the base integrated end cap and the driven retainer end cap extension on a first side extending between the top side and the bottom side, and the based non-integrated end cap and the post end cap extension on a second side extending between the top side and the bottom side, the second side being opposite the first side.

4. The active grille shutter system of claim 1, wherein the plurality of base vanes and the plurality of extension vanes are extruded hollow vanes that have a center channel formed for receiving one or more posts of the base non-integrated end cap and the one or more post end cap extensions.

5. The active grille shutter system of claim 4, wherein the one or more driven retainers and the drive retainer all have a post extending into the center channel of the respective one of the plurality of base vanes and the plurality of extension vanes.

6. The active grille shutter system of claim 4, wherein the one or more drive retainers and the drive retainer each have clamp surfaces that resiliently grasp the outside surface of the respective one of the plurality of base vanes and the plurality of extension vanes.

7. The active grille shutter system of claim 1, wherein the link arm has two link arm pieces joined by a link hitch.

8. The active grille shutter system of claim 7, wherein the link hitch includes snap fitting provided by a slot formed on a first one of the two link arm pieces and a tab formed on the second one of the two link arm pieces.

9. The active grille shutter system of claim 1, wherein the one or more driven retainers and the drive retainer all have a link post extending from the surface and the link arm has an aperture that slides onto the link post.

10. The active grille shutter system of claim 1, wherein the link arm is connected at each vane connection side of the one or more driven retainers and the vane connection side of the drive retainer thereby reducing a gap distance between the one or more driven retainers and the respective based integrated end cap and the driven retainer end cap extension.

11. An active grille shutter system assembled from modular components comprising:

a base integrated end cap having a first female key at a first end and a second female key at a second end, one or more driven retainers each having a vane connection side and an end cap connection side rotatably fixed to the base integrated end cap, a drive retainer with a vane connection side and an end cap connection side rotatably fixed to the base integrated end cap;

a driven retainer end cap extension having a male key at a first end and a female key at a second end, one or more driven retainers having a vane connection side and an end cap connection side rotatably fixed to the driven retainer end cap extension, wherein the male key of the driven retainer end cap extension is connectable to the second female key of the base integrated end cap;

a link arm connected to and extending between each of the one or more driven retainers and the drive retainer.

a base non-integrated end cap having a first female key at a first end and a second female key at a second end, a plurality of posts equal to both the number of one or more driven retainers and the drive retainer located on the base integrated end cap, a post end cap first extension having a male key at a first end and a female key at a second end, one or more posts equal to the number of one or more driven retainers of the driven retainer end cap extension, wherein the male key of the post end cap extension connects to the second female key of the base non-integrated end cap;

a plurality of sets of universal rails each having a first end with a male key shape and a second end with a male key shape, where a first set of the plurality of sets of universal rails has a length that is shorter than all other plurality of sets of universal rails and a second set of the plurality of sets of universal rails has a length that is larger than all the other plurality of sets of universal rails, wherein one selected set of universal rails of the plurality of sets of universal rails has a first universal rail connected to the first female key of the first end of the base integrated end cap using the male key on the first end of the first universal rail and the second end of the first universal rail is connected using the male key on the second end to the first female key of the first end of the base non-integrated end cap, thereby forming a bottom side of the modular frame, and a second universal rail of the selected set of universal rails is connected to the female key of the driven retainer end cap extension and the female key of the post end cap extension, thereby forming a top side of the modular frame;

a plurality of sets of base vanes, a number of individual base vanes in each of the plurality of sets of base vanes is equivalent to the total number of one or more driven retainers of the base integrated end cap plus the drive retainer, wherein each individual base vane of the plurality of sets of base vanes has a first end and a second end, wherein a first set of the plurality of sets of base vanes has a length that is shorter than all other plurality of sets of base vanes and a second set of the plurality of sets of base vanes has a length that is larger than all the other plurality of sets of vanes, wherein one selected set of base vanes of the plurality of sets of vanes is connected between one selected from the group including the base integrated end cap and the base non-integrated end cap; and a plurality of sets of extension vanes, the number of extension vanes in each of the plurality of sets of extension vanes is equivalent to the total number of one or more driven retainers the driven retainer end cap extension, wherein each extension vane of the plurality of sets of extension vanes has a first end and a second end, wherein a first set of the plurality of sets of extension vanes has a length that is shorter than all other plurality of sets of extension vanes and a second set of the plurality of sets of extension vanes has a length that is larger than all the other plurality of sets of extension vanes, wherein one selected set of extension vanes of the plurality of sets of extension vanes is connected between on selected from the group including the driven retainer end cap extension and the post end cap extension.

12. The active grille shutter system of claim 11, further comprising:
a plurality of additional driven retainer end cap extensions connected end to end in series, wherein one of the plurality of additional driven retainer end cap extensions is connected to the second end of the first driven retainer end cap extension in place of the second universal rail and the second universal rail is connected to the last plurality of additional driven retainer end cap extensions in the series, wherein each of the plurality of additional retainer endcap extensions includes one or more driven retainers;
a plurality of additional post end cap extensions connected to the first post end cap extension, wherein the plurality of additional post end cap extensions connect end to end in series, wherein one of the plurality of additional end cap extensions is connected to the second end of the first post end cap extension in place of the second universal rail and the second universal rail is connected to the last one of the plurality of additional post end cap extensions in the series, wherein each of the plurality of additional post end caps includes one or more posts, and
wherein the number of extension vanes in each of the plurality of sets of extension vanes further includes the total number of one or more driven retainers in the plurality of additional driven retainer end cap extensions.

13. The active grille shutter system of claim 11, wherein all the vanes of the plurality of sets of base vanes and all the vanes of the plurality of sets of extension vanes are extruded hollow vanes that have a center channel formed for receiving a respective one of the one or more posts of the base non-integrated end cap and a respective one of the one or more post end cap extensions.

14. The active grille shutter system of claim 13, wherein the one or more driven retainers and the drive retainer each have a post that is selectively inserted into the center channel of a respective one vane selected from the group comprising the plurality of sets of base vanes and the plurality of sets of extension vanes.

15. The active grille shutter system of claim 14, wherein the one or more drive retainers and the drive retainer each have clamp surfaces that resiliently grasp the outside surface of the respective one of the plurality of base vanes and the plurality of extension vanes.

16. The active grille shutter system of claim 11, wherein the link bar has two link arm pieces joined by a link hitch.

17. The active grille shutter system of claim 16, wherein the link hitch includes snap fitting provided by a slot formed on a first one of the two link arm pieces and a tab formed on the second one of the two link arm pieces.

18. The active grille shutter system of claim 11, wherein the one or more driven retainers and the drive retainer all have a link post extending from the surface and the link arm has an aperture that slides onto the link post.

19. The active grille shutter system of claim 11, wherein the link arm is connected at each vane connection side of the one or more driven retainers and the vane connection side of the drive retainer thereby reducing a gap distance between the one or more driven retainers and the respective based integrated end cap and the driven retainer end cap extension.

20. A method of in mold forming an integrated end cap assembly for use on an active grille shutter system comprising the steps of:
providing a first mold cavity with an integrated end cap body forming surface and a link arm forming surface by using a first platen, a second platen and a third platen to form the integrated end cap body forming surface and the third platen and a link arm platen that close form the link arm forming surface; providing a mold cavity with an integrated end cap body forming surface and a link arm forming surface by using a first platen and a second platen to form the integrated end cap body forming surface and a third platen and a link arm platen that close form the link arm forming surface;
providing at least one first shot injection port connected to the link arm forming surface and the integrated end cap retainer forming surface;
injecting a first shot of molten material through the at least one first shot injection port into the link arm forming surface and the integrated end cap body forming surface and forming a link arm and an integrated end cap body;
changing the first mold cavity and providing a second mold cavity with at least one vane retainer forming surface formed from the integrated end cap body, the link arm, a vane retainer platen and a spacer positioned between the link arm and the integrated end cap body; changing the mold cavity and providing at least one vane retainer forming surface formed from the integrated end cap body, the link arm, a vane retainer platen and a spacer positioned between the link arm and the integrated end cap body;
providing at least one second shot injection port connected to the at least one vane retainer forming surface;
injecting a second shot of molten material through the at least one second shot injection port into the at least one vane retainer forming surface and forming at least one vane retainer using the link arm and the integrated end cap body as portions of the retainer forming surface, and
opening the cavity and removing the integrated end cap assembly.

21. The method of claim 20 wherein the step of injecting the second shot of molten material further includes forming a link post on each at least one vane retainer by flowing the second shot of molten material through an aperture in the link arm.

22. The method of claim 20 wherein the step of injecting the second shot of molten material further includes forming one of a driven post on the at least one vane retainer to form a driven vane retainer or a drive post on the at least one vane retainer to form a drive vane retainer.

23. The method of claim 20 wherein the first shot of molten material is a polypropylene material having a mold shrinkage value of about 0.5% and the second shot of molten material is a polybutylene terephthalate material having a mold shrinkage value of greater than about 0.5%.

24. The method of claim 23 wherein the polypropylene material has about 33% glass fiber filler by weight of the polypropylene material with the glass fiber filler and the polybutylene terephthalate material has about 20% glass fiber filler by weight of the polybutylene terephthalate material with a glass filler.

25. The method of claim 20 wherein the base member is formed of polypropylene material having a mold shrinkage value of about 0.003 at ⅛" bar, in/in and the upper arm and lower arm are formed of polybutylene terephthalate material having a mold shrinkage value of greater than about 0.004 at ⅛" bar, in/in.

26. The method of claim 25 wherein the polyamide material has about 33% glass fiber filler by weight of the polypropylene material with the glass fiber filler and the polybutylene terephthalate material has about 20% glass fiber filler by weight of the polybutylene terephthalate material with a glass filler.

27. The method of claim 20 wherein the first shot of molten material is a polypropylene material and the second shot is polyamide material, wherein the first shot and the second shot have the same mold shrinkage value and after the step of injecting the first shot of molten material a step of cooling and shrinking the first shot of molten material occurs before the step of injecting the second shot of molten material.

\* \* \* \* \*